（12） United States Patent
Gaspard et al.

(10) Patent No.: US 10,927,025 B2
(45) Date of Patent: Feb. 23, 2021

(54) PRODUCED WATER TREATMENT SYSTEM

(71) Applicant: W-Industries of Louisiana, LLC, Maurice, LA (US)

(72) Inventors: Brandon Gaspard, Abbeville, LA (US); Brennon Vinet, Maurice, LA (US)

(73) Assignee: W-Industries of Louisiana, LLC, Maurice, LA (US)

( * ) Notice: Subject to any disclaimer, the term of this patent is extended or adjusted under 35 U.S.C. 154(b) by 0 days.

(21) Appl. No.: 16/557,490

(22) Filed: Aug. 30, 2019

(65) Prior Publication Data

US 2020/0071215 A1 Mar. 5, 2020

Related U.S. Application Data

(60) Provisional application No. 62/724,897, filed on Aug. 30, 2018.

(51) Int. Cl.
*C02F 9/00* (2006.01)
*C02F 1/00* (2006.01)
(Continued)

(52) U.S. Cl.
CPC ............... *C02F 9/00* (2013.01); *C02F 1/008* (2013.01); *C02F 1/004* (2013.01); *C02F 1/06* (2013.01);
(Continued)

(58) Field of Classification Search
CPC ........................................................ C02F 9/00
See application file for complete search history.

(56) References Cited

U.S. PATENT DOCUMENTS 8,066,845 B2 11/2011 Duesel, Jr. et al.
8,097,128 B1 * 1/2012 Sherry .................... B05B 1/308
203/11

(Continued)

OTHER PUBLICATIONS

Heat Transfer Jun. 2020, Wikipedia.*
(Continued)

*Primary Examiner* — Peter Keyworth
(74) *Attorney, Agent, or Firm* — Akerman LLP

(57) ABSTRACT

A produced water treatment system includes a skim oil unit, a particulate removal unit, a liquid/liquid separation unit, and a flash concentration unit including a burner for providing hot flue gas into a bath vessel. One or more tubes extending into the bath vessel may be fed hot flue gas by the burner and provide a path for the hot flue gas to flow into the bath vessel. The one or more tubes may include a distribution tube comprising a plurality of ports for hot flue gas to exit the flow path into the bath vessel. At least a portion of a flow path for hot flue gas generated by the burner may extend above a waterline of a bath vessel. Portions flanking the portion of the flow path extending above the waterline may be positioned below the waterline to be thereby submerged during operation. The skim oil unit may include a heated dissolved air floatation system. The heat may be provided by the flash concentration unit. The heat may flash VOCs and dissolved organics from the produced water in a floatation tank of the skim oil. The VOCs and dissolved organics may be provided to the burner for use a fuel and/or incineration.

15 Claims, 11 Drawing Sheets

(51) Int. Cl.
    *C02F 1/24*     (2006.01)
    *C02F 1/06*     (2006.01)
    *C02F 101/32*   (2006.01)
    *C02F 103/10*   (2006.01)

(52) U.S. Cl.
    CPC .......... *C02F 1/24* (2013.01); *C02F 2001/007* (2013.01); *C02F 2101/322* (2013.01); *C02F 2103/10* (2013.01); *C02F 2209/05* (2013.01); *C02F 2209/40* (2013.01)

(56) References Cited

U.S. PATENT DOCUMENTS

| | | | |
|---|---|---|---|
| 8,469,091 | B2 | 6/2013 | Bjorklund et al. |
| 8,753,518 | B2 | 6/2014 | Brunsell et al. |
| 9,120,685 | B2 | 9/2015 | Bjorklund et al. |
| 9,187,343 | B2 | 11/2015 | El-Safty et al. |
| 9,738,553 | B2 | 8/2017 | Chidambaran et al. |
| 9,932,810 | B2 | 4/2018 | Schooley et al. |
| 9,945,221 | B2 | 4/2018 | Neu et al. |
| 10,240,783 | B2 | 3/2019 | Fisk |
| 2010/0219082 | A1 | 9/2010 | Diaz Gonzalez Alcocer |
| 2015/0315055 | A1 | 11/2015 | Chidambarran et al. |
| 2016/0304375 | A1* | 10/2016 | Terui ............... B01D 21/01 |

OTHER PUBLICATIONS

SAGD Produced Water Treatment, Oil & Gas Industry/Case Study, [online], [last modified on Sep. 25, 2014] Retrieved from Internet <URL:http://www.veoliawatertech.com/vwst-northamerica/resources/documents/1/36361,SAGD-CS-9-25_lr.pdf>.

Silica Sorption Process, Thermal Produced Water Treatment, [online], [last modified on Oct. 23, 2014] Retrieved from Internet <URL:http://www.veoliawatertech.com/vwst-northamerica/ressources/documents/1/37100,SilicaSorption_DS_10-22.pdf>.

Shale Flow, "A Transportable, Modular Solution for Produced Water Reuse", [online], [last modified on Jun. 18, 2018] Retrieved from Internet <URL:https://www.veoliawatertechnologies.com/sites/g/files/dvc2476/files/document/2019/09/48371-ShaleFlow2018.pdf>.

Autoflot, Induced Gas Flotation Separation System for Treating Produced Water, [online], [last modified on Dec. 3, 2014) Retrieved from Internet <URL:http://http://www.veoliawatertech.com/vwt-latam/ressources/files/1/49320-AUTOFLOT.pdf>.

Crystallization and Zero Liquid Discharge, [online], [retrieved on Aug. 29, 2019] Retrieved from Internet <URL:https://www.ide-tech.com/en/solutions/industrial-water-treatment/crystallization-and-zero-liquid-discharge/>.

Evaporation & Crystallization Technology, [online], [retrieved on Aug. 29, 2019] Retrieved from Internet <URL: http://technomaps.veoliawatertechnologies.com/hpdevaporation/en/oil-gas-evaporators.htm?bu=doc>.

HPD "Evaporation and Crystallization", [online], [last modified Feb. 8, 2017] Retrieved from Internet <URL: http://technomaps.veoliawatertechnologies.com/processes/lib/pdfs/hpd/3758-HPD_EVAP-CRYSTAL_9-17_LR.pdf>.

PC F Series Evaporators for Industrial Wastewater Treatment, [online], [retrieved on Aug. 29, 2019] Retrieved from Internet: <URL: http://www.evaled.com/pc-f-series/>.

PC R Series Evaporators for Industrial Wastewater Treatment, [online], [published on Jun. 2016], [retrieved on Aug. 29, 2019] Retrieved from Internet: <URL: http://www.evaled.com/pc-f-series/ http://www.evaled.com/pc-r-series/>.

Pearl GTL (Shell) Qatar, [online], [last modified on Oct. 16, 2016] Retrieved from Internet:<URL: http://www.veoliawatertech.com/vwst-northamerica/ressources/documents/1/28711,Case-Study-Shell-Qatar_Corporate.pdf>.

Shale gas extraction: frac water treatment, [online], [retrieved on Aug. 29, 2019] Retrieved from Internet: <URL: http://www.evaled.com/shale-gas-extraction-frac-water-treatment/>.

Technical Services for Water Treatment Industries, [online], [last modified Nov. 3, 2015] Retrieved from Internet: <URL: http://www.veoliawatertechnologies.ca/johnmeunier/ressources/documents/2/19725,Technical-Service-Pamphlet-1-4-Ang.pdf>.

Veolia selected by HDGSK Joint Venture to supply a Zero Liquid Discharge Evaporator and Crystallizer for the Karbala Refinery Project in Iraq, [online], [published on Sep. 28, 2015] Retrieved from Internet: URL:<http://www.veoliawatertech.com/news-resources/press-releases/2015-09-28,veolia-karbala-refinery-zld.htm>.

* cited by examiner

PRODUCED WATER TREATMENT SYSTEM

CROSS-REFERENCE TO RELATED APPLICATIONS

The present application claims the benefit of U.S. provisional patent application 62/724,897, filed Aug. 30, 2018, the content of which is hereby incorporated herein by reference.

TECHNOLOGY

The present description describes methods and apparatuses for processing fluids such as brines and/or other water-based produced waters.

BACKGROUND

Significant produced water is generated at oil and gas wells. Produced water may include water found naturally in formations containing oil and gas or may be water that was injected into the formations during extraction operations such as water flooding or steam flooding. Oil and gas formations may also be stimulated using hydraulic fracturing in which water is injected under pressure to create pathways for recovery of the oil and gas. The water may return to the surface as flowback produced water.

The composition of produced water varies but typically includes high concentrations of suspended solids/particulates and dissolved organic and inorganic compounds. For example, produced water may include hydrocarbons, volatile organic compounds, high salt concentrations, organic acids, and metals such as iron, barium, strontium, magnesium, manganese, mercury, and calcium. Treatment of produced water is a major operating cost in oil and gas recovery operations. In addition to costs for treating produced water, which requires shipping the water to treatment facilities, replacement fresh water must also be shipped to well locations.

What are needed are cost effective produced water treatment systems and methods. It would be further beneficial if the water treatment systems and methods were suitable for on-site or nearby operation and are capable of separating a supply of clean water that does not need to be pulled from the local water supply or shipped long distances. Treatment of produced water to an extent suitable for agricultural or further industrial use would also be beneficial.

SUMMARY

According to various embodiments, produced water may be filtered for suspended solids. This may include passing the produced water through one or more filters and/or skim oil units. In some embodiments, filters may be located within a processing path after entering a skim oil unit, which may preferably include a dissolved air flotation (DAF) system. In one embodiment, the skim oil unit may be equipped for other or additional skim oil techniques, such as froth flotation or induced gas flotation. In some embodiments, a skim oil unit may be heated. Heating may increase VOC evaporation or sublimation. VOCs may be captured for combustion and/or incineration to one or more burners used for brine condensing and steam evolution. In some embodiments, chemical flocculation and/or pH adjustment may be used. Chemical flocculation may cause agglomeration of suspend oil droplets for removal in the skim oil unit, such as skimmed from a DAF system.

In some embodiments, solids removal may also include passing the produced water through a particulate/element filter to remove particulates. As described above, solids are preferably removed down to about 30 microns, or more preferably down to about 20 microns or less, such as about 10 microns or less. Suspended solids separated may be removed from the produced water by skimming the surface. Some large solids or sludge may also be present and drop out during skim oil treatment or within a pre-treatment holding tank or pre-filter and may be collected along lower ends of tanks or within filter cartridges, respectively.

Following initial removal of suspended solids, the process fluid may be further treated for liquid hydrocarbon removal. A portion of liquid hydrocarbons present in the produced water may be removed during suspended solid separation, e.g., in a skim oil unit as described above. Additional liquid hydrocarbons may be removed utilizing liquid/liquid coalescence processing. The processing fluid may then be flashed to concentrate the brine, preferably to approximate the saturation point of the brine solution. The flash evaporated water, or clean steam, may be released into the atmosphere or may be condensed in a condensing unit. In one example, the condensing unit comprises an ambient temperature passive condenser including a plurality of fins for dissipating heat.

In one aspect, a produced water treatment system includes a skim oil unit and a flash concentration unit. The skim oil unit may include a float tank for clarifying a volume of produced water within the float tank. The flash concentration unit may include a bath vessel to receive the clarified produced water and a burner configured to combust a fuel to generate hot flue gas that heats the clarified produced water within the bath vessel to generate steam and concentrate the clarified produced water. The hot flue gas may also indirectly heat the produced water within the float tank of the skim oil unit to flash volatile organic compounds (VOCs) and dissolved organics.

In one embodiment, the float tank comprises a dissolved air floatation tank wherein dissolved air is provided into a lower end of the float tank.

In one embodiment, a thermal transfer partition comprising a thermally conductive material separates the float tank and the bath vessel such that clarified produced water heated by hot flue gas within the bath vessel transfers heat energy to the thermal transfer partition, which further transfers the heat energy to the produced water within the float tank. In one example, the flash concentration unit comprises a direct fire bath system including one or more tubes defining a flow path through which the hot flue gas travels between the burner and a distribution end of the flow path where the hot flue gas is emitted into the bath vessel. In a further example, at least a portion of the flow path defined by the one or more tubes extends below a waterline of the bath vessel that corresponds to an operation level for process fluid within the bath vessel during flash concentration processing to indirectly heat the clarified produced water with the hot flue gas when flowed along the flow path. In still a further example, the one or more tubes include a distribution tube located at the distribution end. The distribution tube may include a plurality of ports through which hot flue gas exits into the bath vessel. One or more of the plurality of ports may be positioned below the waterline of the bath vessel. In still a further example, a first portion of the one or more tubes extends above the waterline such that a corresponding first portion of the flow path extends above the water line. The first portion of the one or more tubes and corresponding first portion of the flow path may be positioned between a second portion of the one or more tubes defining a corresponding second portion of the flow path and a third portion of the one or more tubes defining a corresponding third portion of the flow path. Both the second and third portions of the one or more tubes and the corresponding second and third portions of the flow path may be positioned below the waterline.

In one embodiment, a gas line is positioned to collect gas comprising the flashed VOCs and dissolved organics from the heated produced water in the float tank and supply the gas to the burner for combustion. In one example, the flash concentration unit further comprises a blower for providing a supply of oxidant to the burner. The gas line may comprise a VOC suction line coupled to a negative pressure side of the blower such that the collected gas is pulled into the blower and mixed with oxidant that is supplied to the burner.

In one embodiment, the system further includes a control unit, one or more pumps, and a salinity meter positioned to monitor salt concentration in the clarified produced water. The control unit is operable to control the one or more pumps to control supply of clarified produced water into the bath vessel and release of a concentrated clarified produced water generated by the release of the steam from the clarified produced water. The control unit may utilize salinity data collected by the salinity meter to control the supply of clarified produced water and release of concentrated clarified produced water to maintain a salinity within the clarified process fluid within the bath vessel of between 230,000 ppm and 250,000 ppm.

In one embodiment, the system includes a thermal transfer partition that separates the float tank and the bath vessel such that clarified produced water heated by hot flue gas within the bath vessel transfers heat energy to the thermal transfer partition, which further transfers the heat energy to the produced water within the float tank. The system may further include a gas line positioned to collect gas comprising the flashed VOCs and dissolved organics from the heated produced water in the float tank and supply the gas to the burner for combustion. The float tank may include a dissolved air floatation tank wherein dissolved air is provided into a lower end of the float tank. In one example, the flash concentration unit comprises a direct fire bath system including one or more tubes defining a flow path through which the hot flue gas travels between the burner and a distribution end of the flow path where the hot flue gas is emitted into the bath vessel. The one or more tubes may include a distribution tube comprising a plurality of ports positioned below a waterline of the bath vessel and through which hot flue gas exits into the bath vessel into the clarified produced water. A first portion of the flow path may extend above the waterline and is positioned between second and third portions of the flow path that extend below the waterline.

In one embodiment, the system includes a particulate removal unit comprising one or more element filters to receive the clarified produced water and remove particulates down to about 20 microns or less. The system may also include a liquid/liquid separation unit comprising a liquid/liquid coalescer to receive the clarified produced water after filtration in the particulate removal unit and separate remaining hydrocarbons from the clarified produced water. The system may also include a control unit, one or more pumps, and a salinity meter positioned to monitor salt concentration in the clarified produced water. The control unit may be operable to control the one or more pumps to control supply of clarified produced water into the bath vessel and release of a concentrated clarified produced water generated by the release of the steam from the clarified produced water. The control unit may utilize salinity data collected by the salinity meter to control the supply of clarified produced water and release of concentrated clarified produced water to maintain a salinity within the clarified process fluid within the bath vessel of between 230,000 ppm and 250,000 ppm. In one example, the system also includes a condenser unit. The condenser unit may comprise a condenser to receive the steam generated in the bath vessel and condense the same to produce a clean water stream. The condenser unit may comprise a passive ambient condenser.

In another aspect, a flash concentration unit for flashing and concentrating produced water includes a direct fire bath vessel to receive a supply of solute containing water to concentrate; a burner configured to combust a fuel to generate hot flue gas that heats the solute containing water within the bath vessel to generate steam and concentrate the solute containing water; and one or more tubes defining a flow path through which the hot flue gas travels between the burner and a distribution end of the flow path where the hot flue gas is emitted into the bath vessel. The one or more tubes may comprise a distribution tube positioned at the distribution end of the flow path. The distribution tube may include a plurality of ports positioned below a waterline of the direct fire bath vessel and through which hot flue gas exits into the direct fire bath vessel. At least a first portion of the one or more tubes and corresponding first portion of the flow path may extend above the waterline and be positioned between second and third portions of the one or more tubes and corresponding second and third portions of the flow path that extend below the waterline. In one example, the one or more tubes comprise a fire tube that defines an end of the flow path proximate to the burner. The fire tube may be positioned below the waterline to indirectly heat the solute containing water within the direct fire bath. In another example, the one or more tubes comprise a riser tube that couples to the fire tube and a return tube that couples to the distribution tube. The riser tube may extend vertically above the waterline and fluidically couples with the return tube above the waterline. The return tube may extend vertically from above the waterline to below the waterline to couple with the distribution tube. In a further example, the one or more tubes include a u-box return tube that couples between the riser tube and return tube above the waterline.

In still another aspect, a method of treating produced water includes clarifying the produced water in a dissolved air floatation tank into which dissolved gas is introduced into a lower end of the floatation tank; heating the produced water in the floatation tank during the clarifying with dissolved gas to flash VOCs and dissolved organics within the produced water; skimming the surface of the produced water in the floatation tank; flashing clarified produced water in a direct fire bath. The one or more tubes may extend through the direct fire bath and provide a flow path for hot combustion gas to flow between a burner and a distribution end of the flow path where the hot combustion gas directly heats and flashes a portion of the clarified produced water in the direct fire bath to generate steam and a concentrated brine solution. The direct fire bath may share a partition with the dissolved air floatation tank. The partition may include a thermally conductive material that transfers heat from the clarified produced water in the direct fire bath to the produced water in the dissolved air floatation tank.

In one embodiment, the method further comprises collecting the flashed VOCs and dissolved organic gas and supplying it to the burner for combustion.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIGS. 6A & 6B are isolated views of the skim oil unit and flash concentration unit of the produced water treatment system of FIG. 5, wherein FIG. 6A is an elevated side view in perspective and FIG. 6 is an elevated side view;

DESCRIPTION

The present description describes produced water treatment systems and methods. Produced water treatment may be performed by a fluid processing system to treat produced waters. The system may utilize various processing techniques such as hydrocarbon removal, volatile organic compound (VOC) removal, dissolved organics removal, rapid evaporation, brine concentration, clean steam condensation, chemical precipitation, and/or salt/solids removal. In some embodiments, an inlet stream is separated into a plurality of output streams comprising a clean output, recovered oil output, and a brine output. In a further embodiment, an inlet stream is separated into a plurality of output streams comprising a clean output, a recovered oil output, and at least one solid salt and sediment output. Clean output may comprise clean steam, which in some embodiments, may be condensed to a liquid state for further beneficial use in industry, agriculture, or other beneficial applications.

Figure 1:
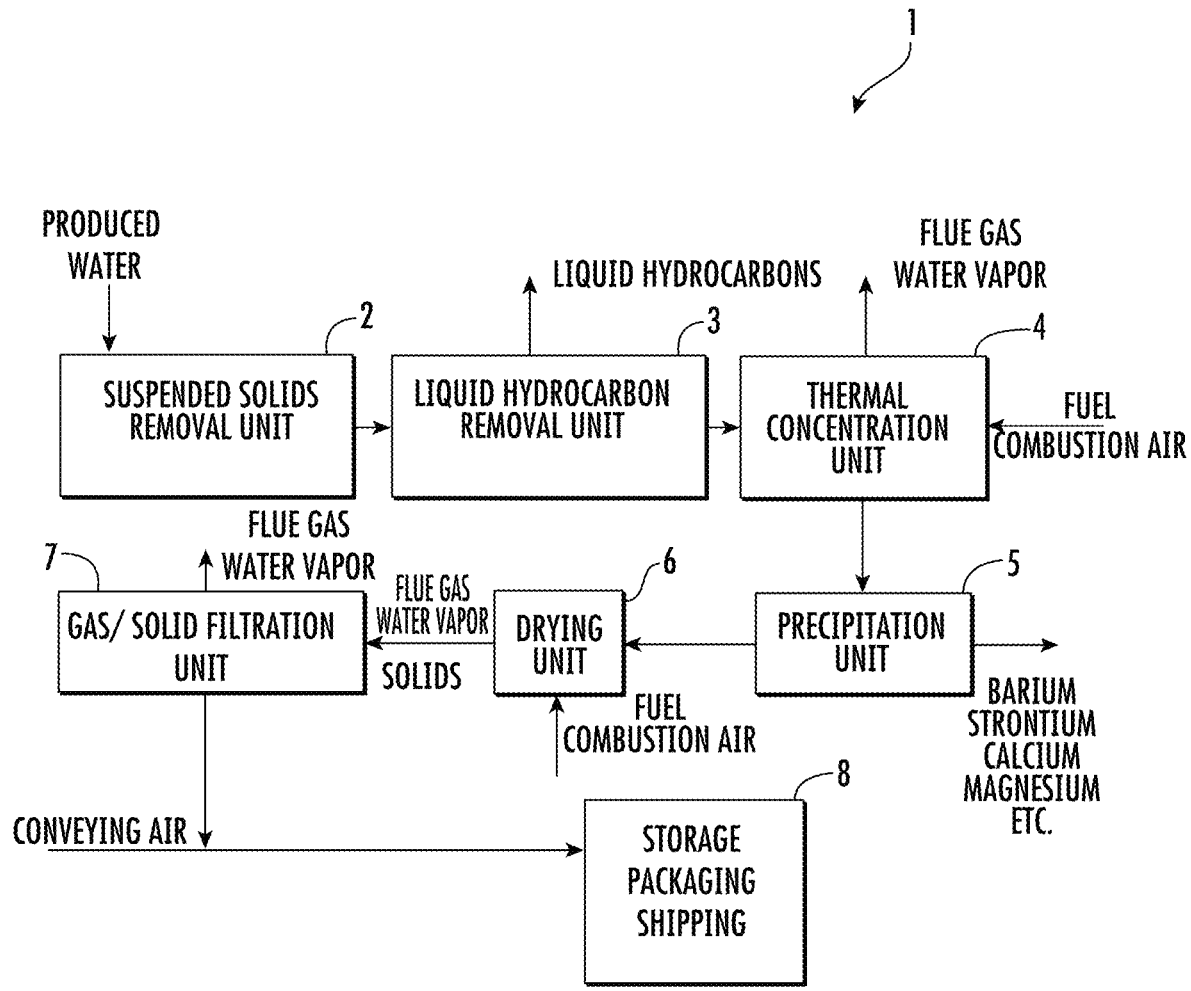
FIG. 1 is a schematic of a produced water treatment system according to various embodiments described herein.

FIG. 1 illustrates an example produced water treatment system 1 for treating produced water according to various more treatment methodologies. The system 1 may include piping and pumping between units and apparatuses and devices thereof for transport of processing materials, agents, and products through the system 1. In various embodiments, the system 1 includes inlet flow control piping and valve system for controlling flow. The inlet flow control piping and valve system may be manual or automated. A level control system may be operable with the flow control piping and valve system to control levels within the system 1. The system 1 may also include a control unit (not shown), e.g., a programmable logic controller, operable to control operations of the system 1. The control unit may be configured for manual operation, automated operation, or both. The control unit may include one or more sensors positioned to monitor flow rates, levels, fuel/air mixtures, pumps, actuators, and/or valves. The control unit may use collected data to modify flow rates, levels, fuel/air mixtures, pumps, actuators, and/or valves to obtain desired operations. Air may be used herein with reference to combustion together with fuel, it is to be appreciated that air is used generally to refer to oxidant in a combustion reaction and need not have the composition of standard air. The control unit may include a processor and a computer readable storage medium storing instructions that when executed by the processor control the operations of the system 1.

Produced water may be treated for removal of suspended solids in the suspended solids removal unit 2. The suspended solids removal unit 2 may include one or more filters through which the produced water is filtered. Additionally or alternatively, suspended solids may be removed by gravity or gravity assisted techniques. For example, the suspended solids removal unit 2 may include a flotation tank. In some embodiments, the flotation tank includes dissolved an air flotation apparatus, froth flotation, or induced gas flotation unit. Solids rising to the surface may be skimmed with a skimmer. Additional solids and sludge may drop out and be collected along the lower end of the float tank. For example, one or more baffles may be used to collect drop out along the lower end of the tank. Additionally or alternatively, the suspended solids removal unit 2 may include a pre-filter that may be used to separate large solids and sludge. In an above or another embodiment, suspended solids removal unit 2 may include a particulate removal device. The particulate removal device may include a particulate/element filter to remove particulates down to a desired size. For example, the particulate removal device may filter particulates down to about 30 microns, or more preferably down to about 20 microns or less, such as about 10 microns or less.

The system 1 may also include liquid hydrocarbon removal unit 3 for removing liquid hydrocarbon. The liquid hydrocarbon removal unit 3 may include one or more oil separation apparatuses such as API separators, centrifugal apparatuses, chemical flocculation apparatuses, coalescing cartridges or plates separators, or skim oil separators, such as dissolved air flotation (DAF), induced air flotation, or froth flotation apparatuses. It will be appreciated that the system 1 may include one or more apparatuses that perform operations with respect to multiple units. For example, the system 1 may include one or more skim oil separators that are utilized by both the suspended solids removal unit 2 and the liquid hydrocarbon removal unit 3. As described in more detail below, in a preferred embodiment, the liquid hydrocarbon removal unit 3 comprises a combination of DAF and liquid/liquid coalescing apparatuses. The liquid hydrocarbon separated from the produced water may be collected by the liquid hydrocarbon removal unit 3 for further treatment, use, recycle, or disposal. Liquid hydrocarbon removal 3 preferably removes about 98% to about 99%, e.g., about 98.8%, of hydrocarbon contaminates from the produced water.

In some embodiments, the suspended solids removal unit 2 and/or liquid hydrocarbon removal unit 3 may include a chemical addition device configured to add chemical to the produced water. The chemicals may include coagulants and/or flocculants, for example. The chemicals may be added in a separate chemical addition tank or may be added in-line with other processing apparatuses.

The system 1 may also include thermal concentration unit 4 configured to concentrate the process fluid following treatments by the suspended solid removal unit 2 and liquid hydrocarbon removal unit 3. Thermal concentration unit 4 may include one or more burners for heating the process fluid to generate steam from a portion of its water component. The one or more burners may be used to apply direct or indirect heat to the process fluid. In one embodiment, the one or more burners include a natural gas forced draft burner. In this or another embodiment, the thermal concentration unit 4 includes tank positioned with respect to one or more burners to allow the burners to heat the process fluid by direct fire in a bath. The one or more burners may be fed a supply of fuel and combustible gas. As noted above, the fuel may include natural gas.

Separation of water, in the form of steam, from the process fluid reduces the volume of the process fluid through transition of a portion of the water to steam that drives concentration of the salt content in a remaining portion of the water. To maximize clean water separation, the volume of the process fluid may be concentrated to approximate saturation of salt in brine solution. For example, the process fluid may be preferably concentrated to a brine having about 230,000 ppm to about 250,000 ppm total dissolved solutes. Although higher and lower concentrations may be used, higher concentrations may be accompanied by salt drop out and lower concentrations may be less efficient for maximizing brine concentration and clean steam separation. The thermal concentration unit 4 may include salinity meters to measure salinity and initiate a pumping system that pumps brine out when the salt concentration is at a set level. The pumping system may also pump process fluid for thermal concentration 4 at a rate that maintains the set level concentration. The clean steam may be exhausted for release into the atmosphere or may be collected for further treatment or use, e.g., in agricultural or other beneficial use. As described in more detail below, the system may also include a condenser for condensing the clean steam.

In various embodiments, the system 1 may utilize excess heat generated by the thermal concentration unit 4 to perform preheating operations. For example, one or more burners may be used to directly or indirectly heat the produced water treated by the liquid hydrocarbon removal unit 3 and/or suspended solids removal unit 2. In one embodiment, the one or more burners may heat a medium or structure positioned between burner flames and produced water in the liquid hydrocarbon removal unit 3 and/or suspended solids removal unit 2. For example, burner flames may indirectly heat a thermal plate positioned between the condenser chamber and DAF system. The thermal plate may comprise, for example, a metal or other thermally conductive material. In some embodiments, burner flames may heat a liquid or gas that is flowed or positioned along a wall of a tank of the suspended solids removal unit 2 and/or liquid hydrocarbon removal unit 3 holding the produced water for treatment. In one embodiment, the liquid or gas comprises clean steam or process fluid being heated for thermal concentration by the thermal concentration unit 4.

While not illustrated, the system 1 may also be configured for VOC and organic contaminant removal via an activated carbon bed, heating, or other suitable technique. In one example, as described above, heat from one or more burners used for thermal concentration may be used to heat the produced water contained in the skim oil unit, e.g., within a float tank, such as a float tank of a DAF system, to separate VOCs and organic contaminants. For example, the produced water may be heated to between about 130° F. and about 150° F. or greater, such as up to 175° F. In one example, the liquid hydrocarbon removal unit 4 includes a float tank for skim oil separation wherein a wall of the float tank is shared with a wall of the thermal concentration unit 4 such that the burner flames indirectly heat the wall via the process fluid being heated or the brine following concentration. In still a further embodiment, collected VOCs and organic contaminants may be supplied to the burner for combustion and/or incineration. In one example, a vent line may be used to pull the gas to the burner. In a further example, a blower, such as a forced draft blower, may couple to the vent line to provide a vacuum that pulls the gas into the blower where it is mixed with oxidant, e.g., air, and fed to the burner.

The remaining effluent or brine may be collected and reinjected, landfilled, or optionally treated further. The illustrated system 1 includes optional apparatuses for further optional treatment of the brine comprising a precipitation unit 5, a drying unit 6, and a gas/solid filtration unit 7.

The precipitation unit 5 may be used to wash the brine clear of unwanted total dissolved solutes (TDS). For example, the precipitation unit 5 may be utilized to precipitate contaminants, such as undesirable minerals, from the brine. In the illustrated embodiment, the precipitation unit 5 is configured to handle forced precipitation of undesired materials contained within the composition such as, for example but not limited to, calcium, barium, strontium, magnesium, etc. The precipitation unit 5 may include a chemical treating system and settling system. The chemical treating system may include a pH precipitation module in which pH altering chemicals or materials are added to drive precipitation of unwanted TDS. The chemical treatment system may optionally also include an agitator to agitate the brine and combined pH altering chemicals or materials for consistent chemical reaction with the brine. The settling system may allow the precipitate to precipitate through the brine for collection. In some embodiments, the settling system includes a back washable ion resin bed filtration system that operates as a protection device to prevent unwanted upsets in the final salt product. At the pH precipitation phase, the salt may be washed of residual components. This waste stream may then be disposed of in a safe and environmentally sound manner. The pH precipitation phase removes contaminants such that the process fluid supplied to the drying unit 6 for processing is substantially comprised of water and dissolved salt.

Following precipitation, the brine may be fed into the drying unit 7 for salts. In some embodiments, sediments may be present that may also be extracted in powder form.

The drying unit 6 may include a high-pressure pumping system and microatomization system. The high pressure pumping system may pump the brine to achieve the high pressure required for microatomization.

The atomization system may introduce the atomized brine into an insulated vessel in which a mass heat delivery system provides heat to the atomized brine to generate a water vapor and a solids process stream comprising dry salt, which may include sediments. The vessel may be sized and designed to sufficiently dry all of the soluble salts from the produced water via evaporation. In one embodiment, the drying unit 6 includes a vertical oriented thermo-insulated vessel housing the microatomization system and mass heat delivery system.

A forced draft heating/removal system may be used to remove dry salt from the drying unit 6 to the gas/solid filtration unit 7 for further separation of the solids from the process stream to be collected and used in industry, agriculture, or road deicing.

The gas/solid filtration unit 7 is configured to further separate and collect salts from the recovered solids process stream. For example, the gas/solid filtration unit 7 may include an extreme temperature filtering apparatus. In one operation, the solids process stream may be ducted to the extreme temperature filtering apparatus wherein captured salts are removed from the solids process stream.

The separated salts and/or solids process stream may be conveyed to a vessel 8 for storage, packaging, shipping, reuse, or disposal.

Figure 2:
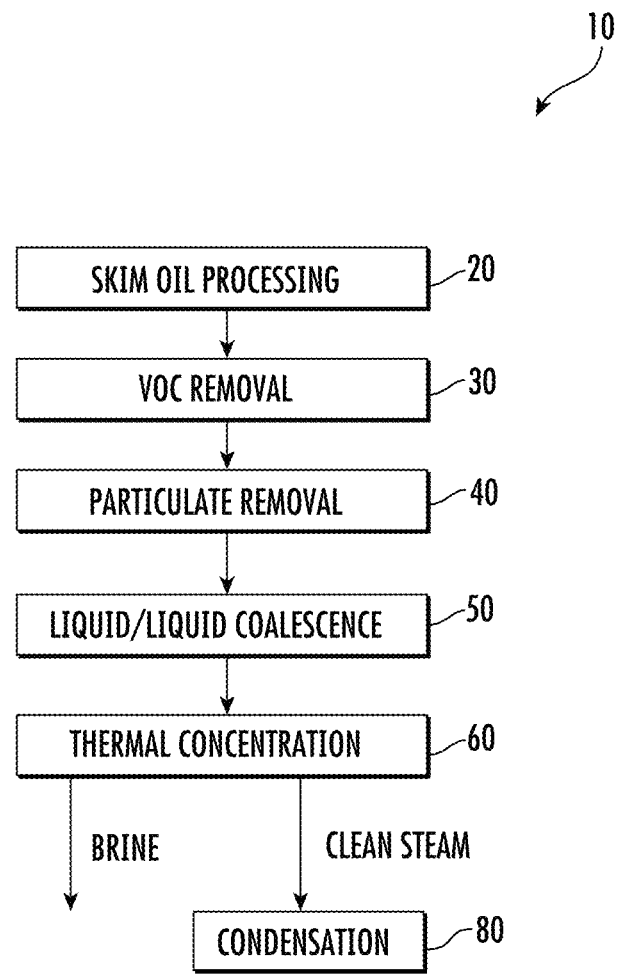
FIG. 2 illustrates a produced water treatment method according to various embodiments described herein.
Figure 3:
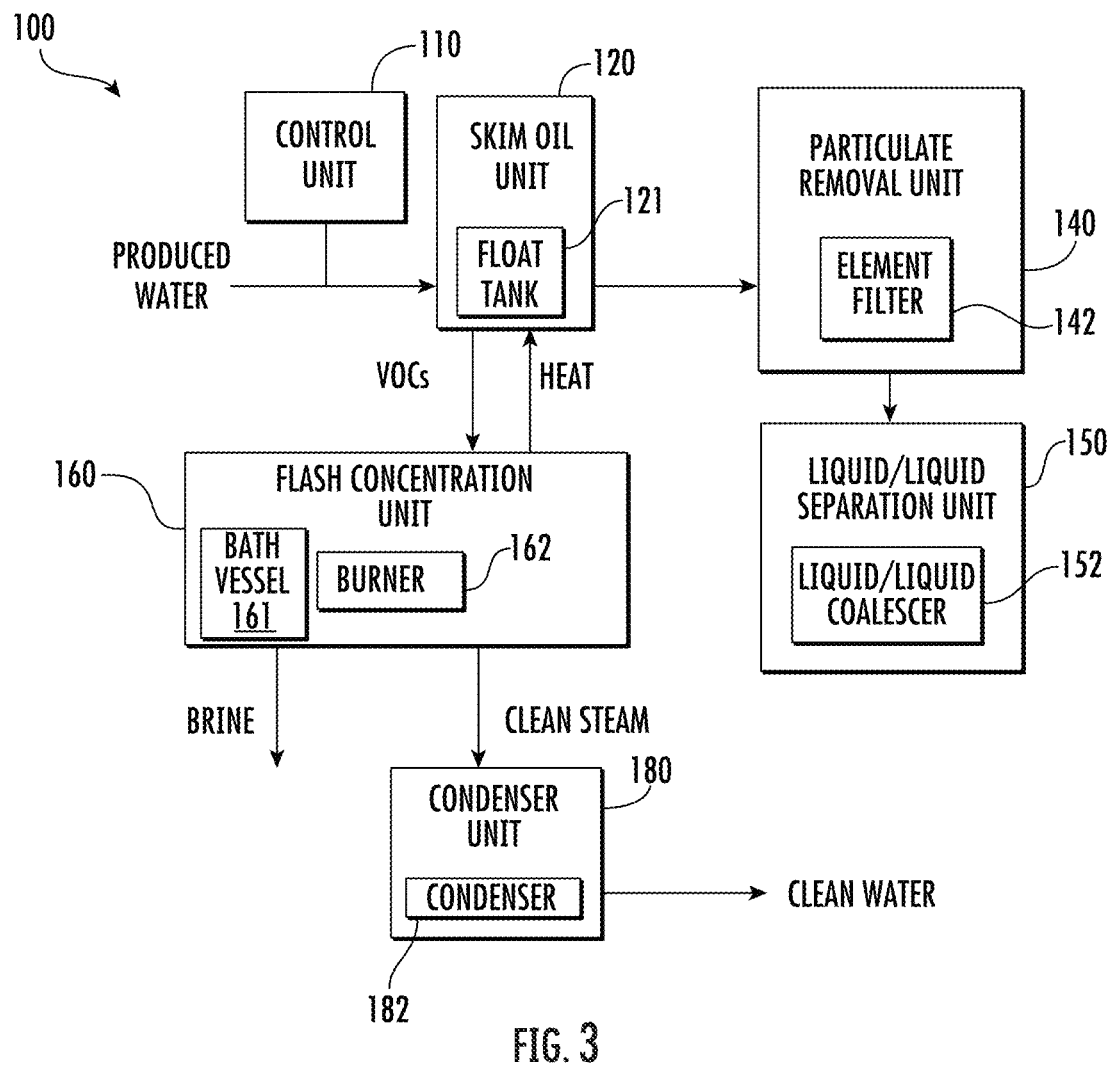
FIG. 3 schematically illustrates a produce water treatment system according to various embodiments described herein.
Figure 4:
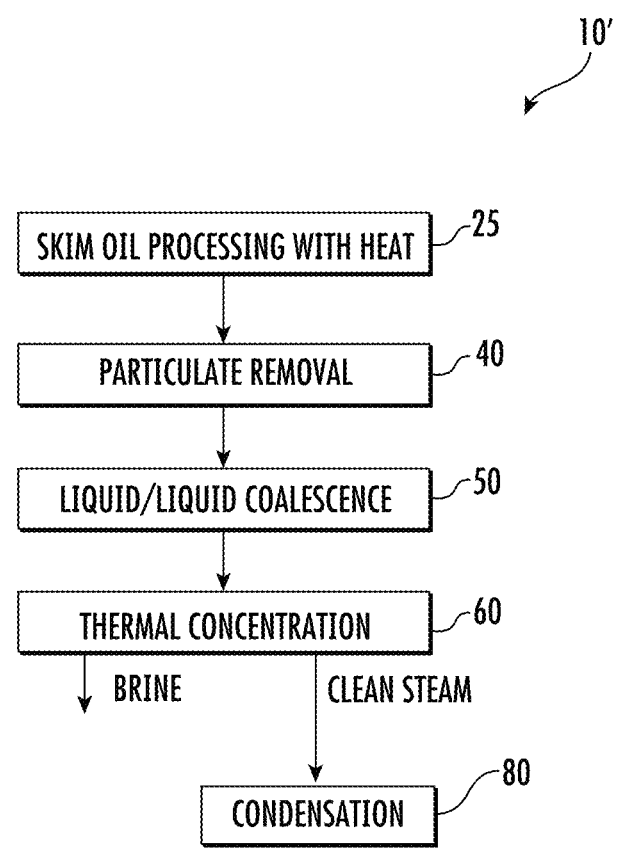
FIG. 4 illustrates an example of a produced water treatment method consistent with the method of FIG. 2 according to various embodiments described herein.

FIG. 2 schematically illustrates a produced water treatment method 10 according to various embodiments. FIG. 3 schematically illustrates a produced water treatment system 100 operable to perform the produced water treatment method 10 according to various embodiments. While the produced water treatment method 10 and produced water treatment system 100 are described together, it is to be appreciated that different or modified water treatment systems may be used to perform method 10 and system 100 may be utilized to perform different or modified water treatment methods. FIG. 4 schematically illustrates a produced water treatment method 10' that is a further embodiment of the method 10 of FIG. 2, wherein like numbers identify like features. Thus, method 10 encompasses method 10' and references to method 10 are to be considered equally applicable to method 10'. In various embodiments, the water treatment system 1 described with respect to FIG. 1 may be used to treat produced water according to the methods 10, 10'.

The produced water treatment method 10 includes skim oil processing 20, VOC removal 30, particulate removal 40, liquid/liquid coalescence 50, thermal concentration 60, and condensation 80. In some embodiments, condensation 80 is optional. The method 10 includes a hydrocarbon removal process that includes skim oil processing 20 and liquid/liquid coalescence 50. In other embodiments, other hydrocarbon separation processing may be used in addition to or instead of one or both of skim oil processing 20 or liquid/liquid coalescence 50.

The produced water treatment system 100 includes an optional control unit 110, a hydrocarbon separation unit comprising a skim oil unit 120 including a float tank 121 comprising one or more float tanks and a liquid/liquid separation unit 150 comprising a liquid/liquid coalescer 152 comprising one or more liquid/liquid coalescers or other liquid/liquid separation devices, a particulate removal unit 140 comprising a particulate/element filter 142 comprising one or more particulate/element filters, a flash concentration unit 160 including a burner 162 comprising one or more burners, and a condenser unit 180 including a condenser 182 comprising one or more condensers.

In the produced water treatment method 10 of FIG. 2, produced water may be processed via a skim oil processing process 20 to remove hydrocarbons and other contaminants, such as certain suspended solids. Skim oil processing 20 includes processing the produced water through a skim oil processing unit, such as skim oil unit 120. The skim oil unit 120 includes a float tank 121 in which contaminates such as suspended solids and hydrocarbons are separated by flotation and then skimmed from the surface. The float tank 121 design may be rectangular, circular, or other shape. In one embodiment, the float tank 121 includes a series connected chambers or pathways providing flow paths that the process fluid snakes through.

The produced water treatment system 100 may include piping and devices for transport of processing materials, agents, and products through the system 100. For example, the system 100 may include one or more pumps (not shown) for pumping materials and product through the system 100. The produced water treatment system 100 may optionally include a control unit 110. The control unit 110 may be configured for manual operation, automated operation, or both. The control unit may 110 include a pumping system comprising one or more pumps (not shown) operable to pump produced water, process fluid, agents, fuel, air, and/or other materials through the system 100. In various embodiments, the control unit 110 includes a metering system including an inlet flow control piping and valve system for controlling flow. The inlet flow control piping and valve system may be manual or automated. Additionally or alternatively, the metering system may include a level control system operable with the flow control piping and valve system to control levels within the system 100. In one example, the control unit 110 includes a controller, e.g., a programmable logic controller, operable to control operations of the system 100. Operations of the controller may be automated. For example, the control unit 110 may include one or more sensors positioned to monitor flow rates, levels, fuel/air mixtures, pumps, actuators, and/or valves. The controller may use collected data to modify flow rates, levels, fuel/air mixtures, pumps, actuators, and/or valves to obtain desired operations. The controller may include a processor and a computer readable storage medium storing instructions that when executed by the processor control the operations of the system 100. In one example, the control unit 110 may track flow rates to control inlet control valves to achieve and/or maintain maximum flow rates while not over running the system 100. In a further embodiment, the control system may link to a remote user interface to provide remote monitoring and control of system 100 through the control unit 110 by suitable communication protocols, e.g., via cellular or satellite transmission as necessary. While the schematic of FIG. 3 illustrates the control unit 110 as being associated with the supply of produced water entering the system 100, it is to be appreciated that the control unit 110 may operatively couple to additional or other components and operations of the system 100.

As noted above, skim oil processing 20 may include feeding produced water into the skim oil unit 120, which may be mediated by the metering system of the control unit 110. The skim oil unit 120 may include any suitable skim oil processing apparatus such as a froth flotation or induced gas flotation unit. In a preferred embodiment, the skim oil unit 120 comprises a DAF system. Gas may be introduced by feeding a gas saturated liquid into the float tank 121 of the DAF system. In some embodiments, the fluid may be a portion of the produced water fed into the float, typically a portion of the clarified process fluid that has already been flowed through the float tank 121. For example, process fluid may be withdraw from the float tank 121 for saturation with gas. The DAF system may include a pressurization vessel, specialty pump, or air drum, into which the liquid is pressurized and compressed air is introduced to saturate the liquid with the gas. The saturated liquid may be introduced into the lower portion of the float tank 121 wherein the pressure reduction allows the gas to form bubbles within the liquid. In one example, the saturated liquid is passed into the float tank 121 through a pressure reduction valve. In some embodiments, the DAF system or another skim oil processing apparatus of the skim oil unit 120 may utilize gas bubbles other than air, such as an inert gas, e.g., nitrogen.

In some embodiments, skim oil processing 20 includes addition of chemicals such as coagulants and/or flocculants. In one example, chemical addition may be performed in separate chemical addition tank (not shown) of the skim oil unit 120, which may include mixing structures (not shown), before introduction of the chemically treated produced water into one or more skim oil float tanks 121. In other embodiments, chemical addition may be within a skim oil float tank 121.

During skim oil processing 20, produced water is fed into the float tank 121 and gas/air is bubbled from a lower end of the tank 121. As the bubbles flow up through the produced water, the bubbles encounter suspended contaminants. In time, a plurality of bubbles may accumulate along surfaces of suspended contaminants to lift the contaminants to the surface of the produced water to thereby clarify the produced water wherein the contaminants may then be skimmed and removed by a skimmer (not shown). The contaminants may be suspended solids or liquids, such as dispersed hydrocarbons, hydrocarbon droplets, or hydrocarbons adhering to solids. Skimmed froth removed as an initial contaminate removal portion from the produced water may be caught or collected, e.g., in catch bin for further treatment, use, recycle, or disposal. Some solids and sludge may drop out and be collected along the lower end of a skim oil processing tank. For example, one or more baffles may be used to collect drop out along the lower end of the tank. In some embodiments, a pre-filter may be used to separate large solids and sludge.

The produced water or clarified process fluid may be processed for volatile organic compounds (VOC) removal 30. Removal of VOCs during VOC removal 30 may also include removal of dissolved organics. In an embodiment, VOCs may be captured by adsorption. For example, the process fluid may subjected to activated carbon filtration treatment through one or more activated carbon filtration beds. In one such embodiment, VOC removal 30 may be combined with particulate removal 50 within the particulate removal unit 140.

VOC removal 30 may additionally or alternatively include heating the produced water or process fluid to evaporate or sublimate VOC content, which may also be referred to as flashing herein. It is to be appreciated that some steps of method 10 may be combined or performed in different orders. For example, VOC removal may be performed at any time before flashing and concentration. In one example, VOC removal 30 may be performed before, during, or after skim oil processing 20 by heating the process fluid to between about 130° F. and about 150° F. or greater, such as up to 175° F., to ensure VOCs and dissolved organics are flashed. Performing VOC removal 30 during skim oil processing 20 may be used to beneficially reduce water treatment processing time.

The produced water treatment system 100 illustrated in FIG. 3 includes a skim oil unit 120 that combines VOC removal 30 with skim oil processing 20. That is, with reference to the produced water treatment method 10' shown in FIG. 4, a skim oil process with heat 25 may be utilized to combine the skim oil processing 20 and VOC removal 30 steps according to method 10. The skim oil unit 120 may be used to perform the skim oil processing with heat 25 of method 10' by adding heat to the produced water during skim oil processing to heat the water to between about 130° F. and about 150° F. or greater, such as up to 175° F., to ensure VOCs and dissolved organics are flashed. The heat may be provided by jacketed float tank 121 through which heated fluid is flowed, a burner positioned with respect to the float tank 121 to directly or indirectly heat produced water, or other heating element arrangement. Skim oil processing with heat 25 of method 10' may otherwise be executed in a similar manner as that described with respect to the skim oil processing 20 of method 10 of FIG. 2. As introduced above with respect to system 1 in FIG. 1, and as described in more detail below, heat used by the skim oil unit 120 in system 100 to heat the produced water may be provided in whole or in-part by burner 162 of flash concentration unit 160. For example, produced water may enters the float tank 121 of the skim oil unit 120 comprising a DAF system that may be heated by a thermal transfer plate attached to the flashing and condensing unit 160. Within this section the produced water enters the initial stages of skim oil processing 20 and VOC contaminate removal 30.

Once separated, VOCs may be collected and treated and/or disposed of in an environmentally responsible manner, e.g., incineration, adsorption, absorption, or condensation. In one embodiment, VOC gas and/or vapors may be pulled from above the process fluid or from a heated adsorption medium onto which the VOCs have been adsorbed. In one example, the flashed VOC gas and vapors may be exhausted and/or pulled through an outlet or vent of the skim oil unit 120, e.g., above the float tank 121, or other apparatus in which the VOCs are removed and thereafter routed for further treatment and/or responsible disposal. In a further example, the captured VOC gas and/or vapors may be routed to a burner for combustion and/or incineration. In various embodiments, and as illustrated in the example embodiment in FIG. 3, the burner may be burner 162 of the flash concentration unit 160 used for thermal concentration 60 processing of the process fluid to generate a clean steam stream and a concentrated brine stream. In some embodiments, the captured VOC gas and/or vapors routed to the burner 162 may comprise a fuel component for the burner 162. In one configuration, the burner 162 comprise a forced draft burner.

The produced water treatment method 10 may also include particulate removal 40. Particulate removal 40 may include passing the process fluid through a particulate/element filter 142 of the particulate removal unit 140 to remove particulates. Particulates are preferably removed down to about 30 microns, or more preferably down to about 20 microns or less, such as about 10 microns or less. Particulate removal 40 will typically be performed after skim oil processing 20 and VOC removal 30, e.g., following skim oil processing with heat 25, but in some configurations particulate removal 40 may be at least partially performed prior to one or more of skim oil processing 20 or VOC removal 30. Notably, some suspended solids may be removed during skim oil processing 20 in the skim or drop out. In some embodiments, a portion of the suspended solids may be removed within a pre-treatment holding tank or pre-filter and may be collected along a lower end of the holding tank or within filter cartridges, respectively. Particulate removal 40 reduces solid accumulation from building up during thermal concentration 60. Thus, when the method 10 includes continuous and/or in-line apparatuses, particulate removal 40 is preferred. However, in some embodiments, a separate particulate removal 40 through a particulate/element filter down to 30 microns or less may be optional. In one example, the particulate removal unit 140 includes one or more particulate/element filters 142 of the kind known to those skilled in the art, such as those manufactured by Pentair, Minneapolis, Minn.

The hydrocarbon removal processing of method 10 may further include use of liquid/liquid coalescence 50 to remove remaining hydrocarbons. In some embodiments, other liquid/liquid separation techniques may be used in addition to or instead of liquid/liquid coalescence. The liquid/liquid separation unit 150 of system 100 may include one or more hydrocarbon removal elements. For example, the hydrocarbon removal elements may be of the kind known to those skilled in the art, such as those manufactured by Pentair, Minneapolis, Minn. In various embodiments, the hydrocarbons are separated using liquid/liquid coalescence 50, may be collected and combined with or treated in a manner similar to the skim. According to various embodiments, following liquid/liquid coalescence 50 about 98% to about 99%, e.g., about 98.8%, of hydrocarbon contaminates have been removed from the process fluid.

The process fluid may be thermal concentrated 60 to generate a clean steam stream and a concentrated brine stream. For example, the flash concentration unit 160 may include a bath vessel 161 and burner 162 comprising a direct fired-bath configured to perform flash evaporation and volume condensing. Burner 162, which may include multiple burners, may be directed at process fluid contained in the bath vessel 161 to drive flash evaporation to achieve thermal concentration 60. The burner 162 may include a burner known to those skilled in the art, such as one or more Eclipse ThermJets manufactured by Eclipse, a Honeywell company. A forced draft fan may also be used to provide excess oxidant, e.g., air, to the burner 162. The forced draft fan may include a blower known to those skilled in the art, such as one or more blowers manufactured by Hauk, a Honeywell company. In a preferred embodiment, the one or more burners comprise a forced draft natural gas burner. In one embodiment, the flash concentration unit 160 comprises a direct fire bath wherein one or more tubes provide a flow path for hot flue gas to travel between the burner 160 and a distribution end where the hot flue gas is emitted into the bath vessel 161 to heat the process fluid. The distribution end may comprise a distribution tube portion comprising a plurality of ports from which hot flue gas may exit the flow path. A portion of the path defined by the tubes may be positioned below an operable waterline or fluid level as to be submerged during operation to indirectly heat the process fluid as well as directly heat the process fluid. For example, the distribution tube or ports thereof may be positioned below the waterline. In one embodiment, a portion of the path extends above the waterline. In a further embodiment, the portion of the path extending above the waterline may be positioned between portions of the path extending below the waterline. In one embodiment, an end of the one or more tubes proximate to the burner 162 is positioned below the waterline. In some embodiments, the waterline corresponds to a maximum liquid level in which the bath vessel 161 is designed to operate. However, as bath vessels 161 may be suitable for operation at multiple levels, the waterline may correspond to a designed liquid level suitable for operation. Those skilled in the art are aware of operable designed operation levels.

Flashing may comprise subjecting the process fluid to a directed fired water bath treatment wherein the process fluid acquires heat required to separate the water from the remaining composition. The separation of water reduces the volume of the process fluid through transition of a portion of the water to steam and concentrates the salt content in a remaining portion of the water. To maximize clean water separation, the volume of the process fluid may be concentrated to approximate saturation of salt in water solution. For example, the process fluid may be preferably concentrated to a brine having about 230,000 ppm to about 250,000 ppm total dissolved solutes. Higher concentrations may result in the solution breaking out and turning to solid. Lower concentrations may also be used but may be less efficient. Thus, the method 10 may include maximizing water separation and volume reduction while maintaining a brine solution product by concentrate the brine solution product to approximate its saturation point.

In some embodiments, the flash concentration unit 160 or control unit 110 includes one or more salinity meters for measuring salinity of the process fluid in the bath vessel 161. For example, in one embodiment the method 10 may include utilizing salinity meters that measure brine concentration during heating. When a target concentration point below or approximating saturation is hit, a pumping system of the concentration unit 160 or control unit 110 may initiate to pump brine from the bath vessel 161. The pumping system may also pump additional process fluid into the bath vessel 161. The pumping of brine from the bath vessel 161 and process fluid into the bath vessel 161 may be performed at a rate that maintains a set point below or approximately at the saturation point of the brine at the bath temperature. For example, pumping volumes that are too low may drive the concentration up and allow solids to build while pumping volumes that are too high may allow brine concentration to drop. Again, as noted above, pumping is preferably set to maintain maximum concentration for maximum efficiency. Notably, as the temperature of the bath is high, in some embodiments, the set point may correspond to a supersaturated brine solution. In one example, the control unit 110 includes or is in data communication with salinity meter data and may be operable to initiate pumping and or modification of fuel/air to burner 162. In another example, responding to salinity meter data may be manual.

As introduced above, the method 10 may include utilizing excess heat generated from the flash concentration unit 160 to perform preheating operations. For example, the flash concentration unit 160 may be used to directly or indirectly heat the produced water supplied to the skim oil unit 120. The burner 162 may heat a medium or structure positioned between burner flames and produced water in the skim oil unit 120. For example, burner flames may be directed to a thermal plate that positioned between the burner flames and produced water in the skim oil unit 120. The thermal plate may comprise, for example, a metal or other thermally conductive material. In some embodiments, burner flames may heat a liquid or gas that is flowed or positioned along a wall of the float tank 121 or a pre-float tank holding tank.

The remaining effluent or brine may be collected and reinjected, landfilled, or treated further. In further embodiments, the brine may be optionally treated as described above with respect to FIG. 1 to separate salt and sediments from the brine.

The flash concentration unit 160 may include a steam outlet for a clean steam stream to exit the unit. The clean steam stream may also include portion of the flue gas resulting from combustion at the burner 162. The clean steam may exit to the atmosphere or may be collected for further treatment or use.

In one embodiment, the method 10 may optionally include condensing 80 the steam. For example, the steam may be supplied to condenser unit 180 including a condenser 182 comprising one or more condensers for conversion of the clean steam back to liquid state for industry, agricultural, or other use. Any suitable condenser 182 may be used. In some embodiments, the condenser 182 comprises an ambient passive condenser. The ambient passive condenser may include piping for transport of the steam and condensed water. The ambient passive condenser may include thermally conductive structures having high surface area for heat dissipation along the piping. For example, the piping may be coupled to fins. In one embodiment, the ambient passive condenser includes about 1 inch to about 10 inch, about 1 inch to about 5 inch, or about 3 inch piping coupled to heat dissipating fins. The condenser 182 may operate at any suitable pressure. In one embodiment, the condenser 182 operates at a vacuum pressure. For example, the condenser 182 may operate at about 6 psi, about 3 psi, about 1 psi or less. In other embodiments, the condenser 182 may operate at ambient pressure or an above ambient pressure.

In some embodiments, the condenser 182 of the condenser unit 180 may include one or more condensers that may be actively cooled with refrigerant or cooled fluid. In one example, the condenser 182 includes an ambient passively cooled condenser and an actively cooled condenser. In some embodiments, ambient cooled condensers may be selectively operable to cool actively. In one example, fans may be used to direct air along piping and/or fins.

The various units may be provided in modular configurations. For example, one or more units may be provided on one or more skids for convenient onsite setup. In various embodiments, the skim oil unit 120 or float tank 121 thereof may be provide on the same skid as the flash concentration unit 160 or bath vessel 161 thereof. In a preferred embodiment, the bath vessel 161 and the float tank 121 share a partition or wall comprising a thermal transfer plate.

Figure 10:
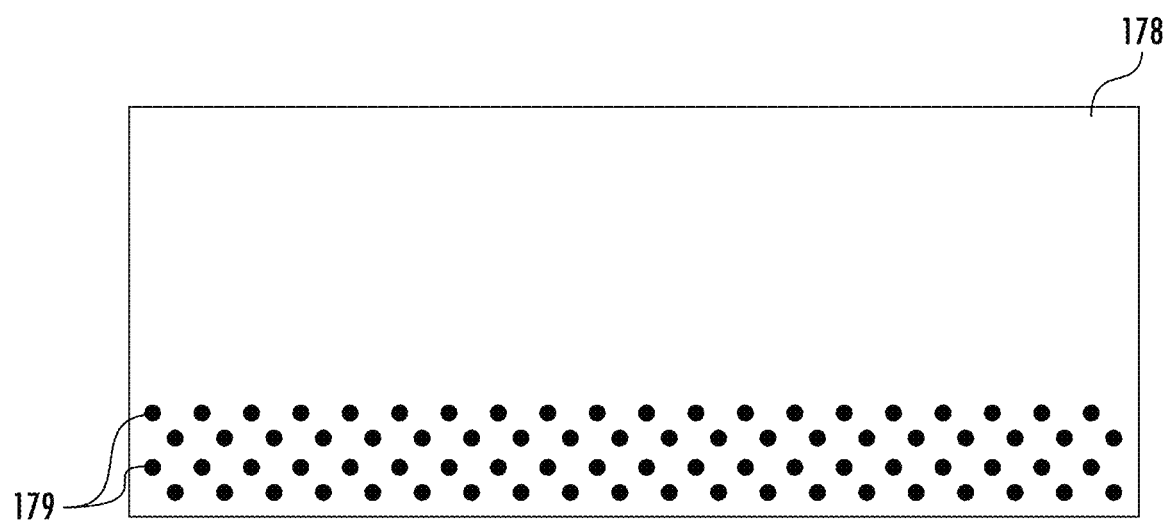
FIG. 10 is an example of a distribution tube according to various embodiments described herein.

FIGS. 5-7 & 10 illustrate various views of an embodiment of the produced water treatment system 100 described above with respect to FIG. 3, wherein like features are identified by like numbers. FIG. 10 illustrates an example distribution tube 178. The produced water treatment system 100' illustrated in FIG. 5 includes a hydrocarbon separation unit comprising a skim oil unit 120 including a float tank 121 comprising one or more float tanks and a liquid/liquid separation unit 150, a particulate removal unit 140, and a flash concentration unit 160. The produced water treatment system 100' also includes an optional control unit 110 and condenser unit 180. In various embodiments, the produced water treatment system 100' may also include a precipitation unit, drying unit, and/or gas/solid filtration unit as described above with respect to FIG. 1.

The control unit 110 includes a pumping system including one or more pumps 112 operable to pump produced water and process fluid through the system 100'. The control unit 110 also includes a metering system having a level control system that together with a flow control piping and valve system controls flow and process levels within the system 100'. For example, the flow control piping and valve system may include one or more valves 114 that may be opened and closed by the metering system to control system levels. In various embodiments, the inlet flow control piping and valve system may be manual or automated. The control unit 110 may include one or more sensors to monitor flow rates, salinity, pressure, temperature, fluid levels, or other operation parameters. In one example, the control unit 110 may track flow rates to control inlet control valves to achieve and/or maintain maximum flow rates while not over running the system 100'. The piping and valve system may also include piping and valves for providing fuel/air to burner 162, VOC vapor to burner 162, and/or supply and withdraw process fluids and materials to the various units of the system 100'. In a further embodiment, the control unit 110 may provide a remote user interface allowing remote monitoring and/or control of operation of the system 100'.

In one example, the control unit 110 includes a controller, e.g., a programmable logic controller, operable to control operations of the system 100'. The controller may be configured for manual operation, automated operation, or both. The controller may include or communication with one or more sensors positioned to monitor flow rates, fluid levels, temperature, pressure, fuel/air mixtures, salinity, pumps, actuators, and/or valves. The controller may integrate with the metering system and pumping system to collect and analyze operation data to modify flow rates, levels, fuel/air mixtures, pumps, actuators, and/or valves to obtain desired operations. The controller may include a processor in data communication with a computer readable storage medium storing instructions that when executed by the processor control the operations of the system 100'. The controller may receive process data from a salinity sensor and, based on analysis of the data, initiate, terminate, or modify one or more supply and/or withdrawal pumps (not shown) of the pumping system that deliver process fluid and withdraw concentrated brine from a bath vessel 161 of the flashing and condenser unit 160.

The skim oil unit 120 includes a float tanks 121 in which contaminates such as suspended solids and hydrocarbons are separated by flotation and then skimmed from the surface. As noted above, the skim oil unit 120 may include any suitable skim oil process; however, as illustrated, the skim oil unit 120 comprises a DAF system in which dissolved air is introduced into the float tank 121. The float tank 121 includes a pathway through which the produced fluid travels, as indicated by the broken lines in FIG. 7. A plurality flow panels 122 are positioned in the float tank and include arches and u-bends to assist in driving flow up to the surface of the produced water within the float tank 121. As most clearly shown in the view of FIG. 6B, a skimmer 124 is positioned in the float tank 121 and includes an inlet along the waterline therein to skim the surface of the produced water. The skim may continuously or periodically be withdrawn from the skimmer 124 by a skim oil blowcase 126 for collection.

The produced water treatment system 100' includes a combination skim oil unit 120 and VOC removal unit. For example, as described above and elsewhere herein, heat is provided to the float tank 121 to heat the produced water to between about 130° F. and about 150° F. or greater, such as up to 175° F., to flash VOCs and dissolved organics are flashed. While separate heating may be used, in the illustrated embodiment, heat is provided by the flash concentration unit 160. As shown, the bath vessel 161 and the float tank 121 share a partition or wall comprising a thermal transfer plate. The shared wall or thermal transfer partition 128 between the float tank 121 and the flash concentration unit 160 transfers heat to the produced fluid in the float tank 121 to indirectly heat the same. The thermal transfer partition 128 preferably comprises a thermally conductive material such as a metal or allow, e.g., steel. The thermal transfer partition 128 runs the length of the float tank 121 and the corresponding length of the bath vessel 161. In other embodiments, the thermal transfer partition 128 spans additional or less area. In one embodiment, the thermal transfer partition 128 includes a portion of a fire tube 170, riser tube 172, and/or return tube 174 that forms a partition with or extends within the float tank 121. For example, a fire tube 170 may abut or extend through a portion of the float tank 121 to indirectly heat the produced water to flash VOCs and dissolved organics. The thermal transfer partition 128 is generally planar, but in other embodiments the thermal transfer partition may be curved or otherwise include surface area increasing formations.

The particulate removal unit 140 includes two particulate/element filters 140 to remove particulates down to a desired size. For example, the particulate/element filters 140 may filter particulates down to about 30 microns, or more preferably down to about 20 microns or less, such as about 10 microns or less. In some embodiments, fewer or additional particulate/element filters 142 may be used.

The liquid/liquid separation unit 150 includes ae liquid/liquid coalescer 152 configured to separate remaining hydrocarbons from the process fluid. It will be appreciated that in some embodiments, additional or other liquid/liquid separation apparatuses may be used. Following liquid/liquid coalescence about 98% to about 99%, e.g., about 98.8%, of hydrocarbon contaminates have preferably been removed from the process fluid.

The flash concentration unit 160 includes a bath vessel 161 for containing process fluid during the flashing and concentration process. A blower 134 comprising a forced draft blower is positioned to deliver oxidant, e.g., air to two burners 160. A fuel line 165 is positioned to deliver a fuel supply for combustion at the burners 160. In the illustrated embodiment, the fuel comprises natural gas. Some embodiments may use other fuels. As noted above, the VOCs and dissolved organics flashed in the skim oil unit 120 may be supplied to the burner 162 for combustion and/or incineration. In the illustrated embodiment, a VOC gas suction line extends between the float tank 121 and the blower 163. The operation of the blower 163 creates a vacuum that pulls the dissolved organics and VOC gases into the blower 163 where the gas mixes with the air supply that is further supplied to the burners 162 along with the fuel for combustion. It will be appreciated that in some embodiments, VOCs and/or dissolved organics are supplied to the burner passively or actively in another manner than pulling with a blower 163.

In one embodiment, the flash concentration unit 160 comprises a direct fire bath wherein one or more tubes provide a flow path for hot flue gas to travel between the burner 160 and a distribution end where the hot flue gas is emitted into the bath vessel 161 to heat the process fluid. The distribution end may comprise a distribution tube 178 comprising a plurality of ports 179 (see, e.g., FIG. 10) from which hot flue gas may exit the flow path. A portion of the path defined by the tubes may be positioned below an operable waterline or fluid level as to be submerged during operation to indirectly heat the process fluid as well as directly heat the process fluid. For example, the distribution tube 178 or ports 179 thereof may be positioned below the waterline. In one embodiment, a portion of the path extends above the waterline. In a further embodiment, the portion of the path extending above the waterline may be positioned between portions of the path extending below the waterline. In one embodiment, an end of the one or more tubes proximate to the burner 162 is positioned below the waterline. Further to the above, one or more tubes extending into the bath vessel 161 may be fed hot flue gas by the burner 162 and provide a flow path for the hot flue gas to flow into the bath vessel 161. The one or more tubes may include a fire tube 170 for coupling the tubes to the hot flue gas and a distribution tube 178 comprising a plurality of ports 179 for hot flue gas to exit the flow path into the bath vessel. In the illustrated embodiment, the fire tube 170 extends through the bath vessel 161. The fire tube 170 includes two ends 170a, 170b, each associated with a burner positioned to direct flames into the fire tube 170. Thus, a fire tube 170 may be fed by multiple burners 162 at two or more openings or ends. The fire tube 170 fluidically couples to the distribution tube 178 having a plurality of ports 179 providing passages for hot flue gas to exit the interior path of the distribution tube 178. A plurality of hot flue gas jets may extend into the surrounding process fluid contained within the bath vessel 161 to flash the process fluid for steam generation and concentration of the process fluid. The ports 179 are sized and numbered to handle the burners 162 plus all the excess oxidant volume, e.g., air, generated by the forced draft blower 163. For example, in one embodiment, ports 179 may be between about 0.01 inches and about 5 inches in diameter. The ports 179 may be around all or a portion of the circumference of the distribution tube 178. In some embodiments, all or a majority of ports 179 may be positioned along a bottom half of the distribution tube 178 to maximized residence in the process fluid. In one embodiment, the distribution tube includes a plurality of about 2 inch diameter ports 179 along the bottom half of the distribution tube 178. In an above or another embodiment, a cross sectional area of the ports 179 is about equal to the cross section of the distribution tube. It will be appreciated that different size tubes, bath volumes, burner outputs, and other parameters may result in altering size, location, and/or number of ports 179. The ports 179 may be distributed along the length and/or perimeter of the distribution tube 178 in any suitable manner. For example, ports 179 may be distributed along a full or partial length of the distribution tube 178 and around all or a portion of the circumference of the distribution tube 178. The illustrated distribution tube 178 extends about 60% of the length of the bath vessel 161. In other embodiments, the distribution tube 178 extends less than 60% or greater than 60% of the length of the bath vessel 161. In the above or illustrated embodiment, ports 179 may be distributed along about 20%, about 40%, about 60%, about 80%, or about 100% of the length of the distribution tube 178.

In various embodiments, at least a portion of the path through which the hot flue gas flows between the burner 162 and the distribution ports 179 extends above an operative waterline within the bath vessel 161. This configuration prevents process fluid from entering the flow path of the hot flue gas to foul the burner. In one embodiment, a portions flanking both sides of the portion of the path extending above the waterline are positioned below the waterline to thereby be submerged during operation of the flash concentration unit 160. In some embodiments, a burner end 170a, 170b is positioned above the waterline. In the illustrated embodiment, the burner ends 170a, 170b are positioned below the waterline and at least a portion of the flow path of the hot flue gas between the burner 162 and distribution tube 178 extends above the waterline.

The flash concentration unit 160 includes both a submerged fire tube 170 and a submerged distribution tube 178. The fire tube 170 has a u-shape and extends through the bath vessel 161 along a u-shaped path. Extending a portion of the hot flue gas flow path through the bath vessel 161 provides indirect heating of the surrounding process fluid. The u-shaped path increases tube surfaces exposed to processing fluid to increase heat transfer to the process fluid, which also operates as a coolant to reduce heat stress to the fire tube 170 as well as to the other submerged tubes. Combining indirect and direct heating of the process fluid within the bath vessel significantly increases heating efficiency, lowering operating costs and increasing production output. A riser tube 172 is fluidically coupled to the fire tube 170 and extends vertically to a position above a waterline of the bath vessel 161. The waterline corresponds to the operative level of process fluid within the bath vessel 161 during flashing and concentration and may be the top of the bath vessel 161 or a level below the top. The riser tube 172 fluidically couples with a return tube 174 that extends to a flue gas mass distribution tube 178. As shown, the return tube 174 extends to below the waterline along with the distribution tube 178; however, in some embodiments, only the distribution tube 178 extends below the waterline. A u-box return tube 176 is also coupled between the riser tube 172 and the return tube 174 to provide a path for hot flue gas to flow between the interior paths of the riser tube 172 and return tube 174.

The present disclosure contemplates other variations to the illustrated embodiment. For example, in some embodiments, the fire tube 170 extends partially or entirely outside of the bath vessel 161. The fire tube 170 may extend along paths of various shapes, e.g., linear, arcuate, or u-shaped (as shown), for example. Similarly, the distribution tube 178 may extend along various shaped paths, e.g., linear (as shown), arcuate, or u-shaped. In one embodiment, the flash concentration unit 160 includes multiple distribution tubes. Each distribution tube 178 may be fluidically coupled to one or more fire tubes 170. In some embodiments, fire tube 170 is fed by one or more burners only at a single end. In some embodiments, the flash concentration unit 160 includes multiple fire tubes 170 each fed with one or more burners 162. In one embodiment, multiple fire tubes 170 and/or distribution tubes 178 extend through or partly through the bath vessel 161. The orientation and relative positions of the fire tube 170 and the distribution tube may vary. For example, in one embodiment, all or a portion of a distribution tube 178 may position vertically below all or a portion of a fire tube 170. While the fire tube 170 and distribution tube are shown as extending along horizontal planes, in some embodiments, one or more of the fire tube 170 or distribution tube may extend at an upward or downward directed angle with respect to the horizontal. In various embodiments, the distribution tube 178 may have ports 179 or sections including ports 179 that may be selectively opened or closed to modify flue gas output to handle different mass flows of flue gas. For example, a partition within or over the distribution tube 178 may be selectively operated to increase or decrease available ports 179 for release of hot flue gas. Separation of water from the process fluid reduces the volume of the fluid and concentrates the salt content in a remaining portion of the water. To maximize clean water separation, the volume of the process fluid may be concentrated to approximate saturation of salt in water solution. For example, the process fluid may be preferably concentrated to a brine having about 230,000 ppm to about 250,000 ppm total dissolved solutes. Higher concentrations may result in the solution breaking out and turning to solid. Lower concentrations may also be used but may be less efficient. Thus, the method 10 may include maximizing water separation and volume reduction while maintaining a brine solution product by concentrate the brine solution product to approximate its saturation point. As introduced above with respect to FIGS. 1-4, the system 100' may include one or more salinity meters for measuring salinity of the process fluid in the bath vessel 161 during heating. When a target concentration point below or approximating saturation is hit, the pumping system initiates to pump brine from the bath vessel 161. The pumping system may also pump additional process fluid into the bath vessel 161. The pumping of brine from the bath vessel 161 and process fluid into the bath vessel 161 may be performed at a rate that maintains a set point below or approximately at the saturation point of the brine at the bath temperature. Pumping is preferably set to maintain maximum concentration for maximum efficiency. In one example, the control unit 110 includes or is in data communication with salinity meter data and may be operable to initiate pumping and or modification of fuel/air to burner 162. In another example, responding to salinity meter data may be manual.

Figure 5:
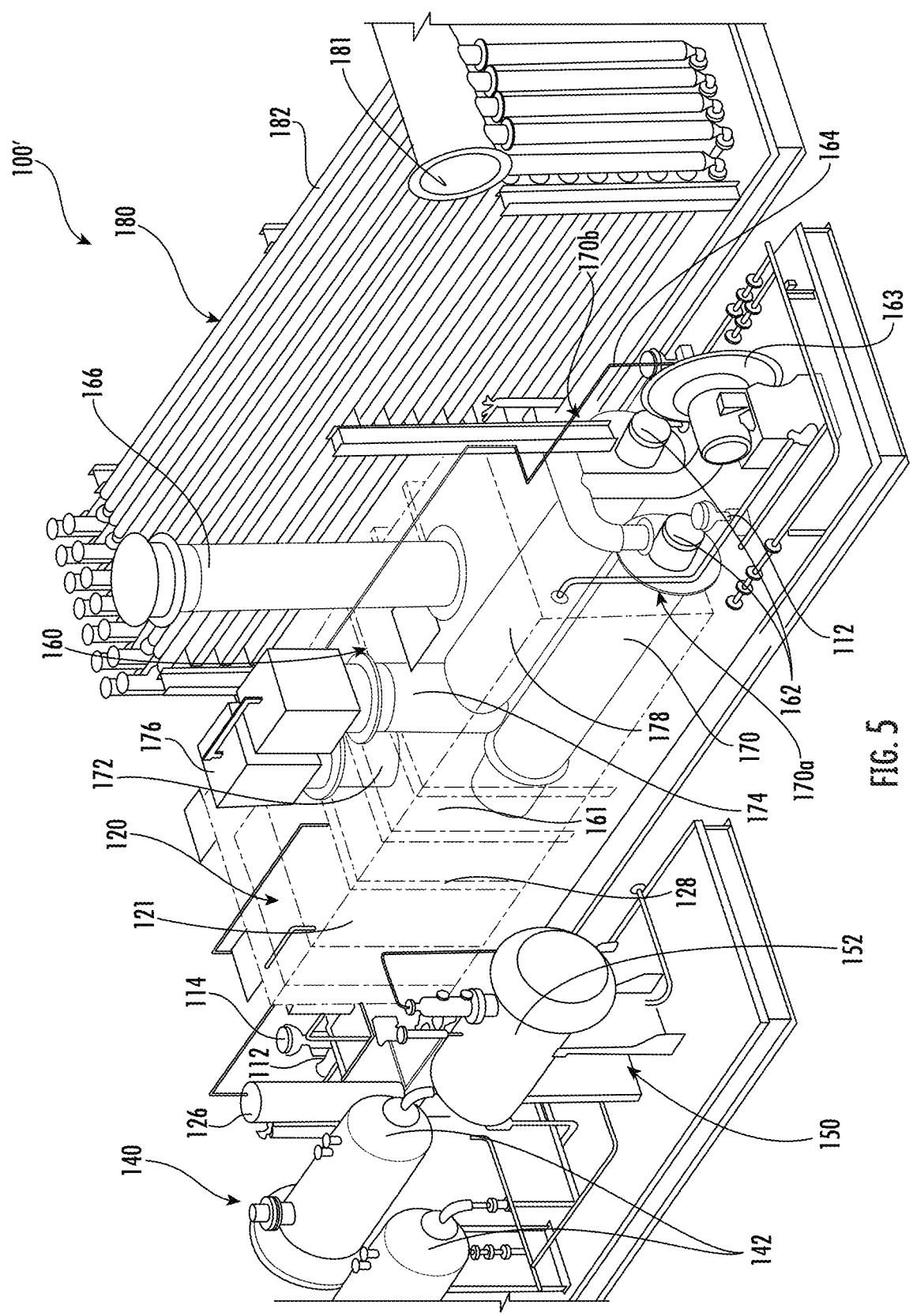
FIG. 5 illustrates an embodiment of the produced water treatment system of FIG. 3 according to various embodiments described herein.
Figure 6A:
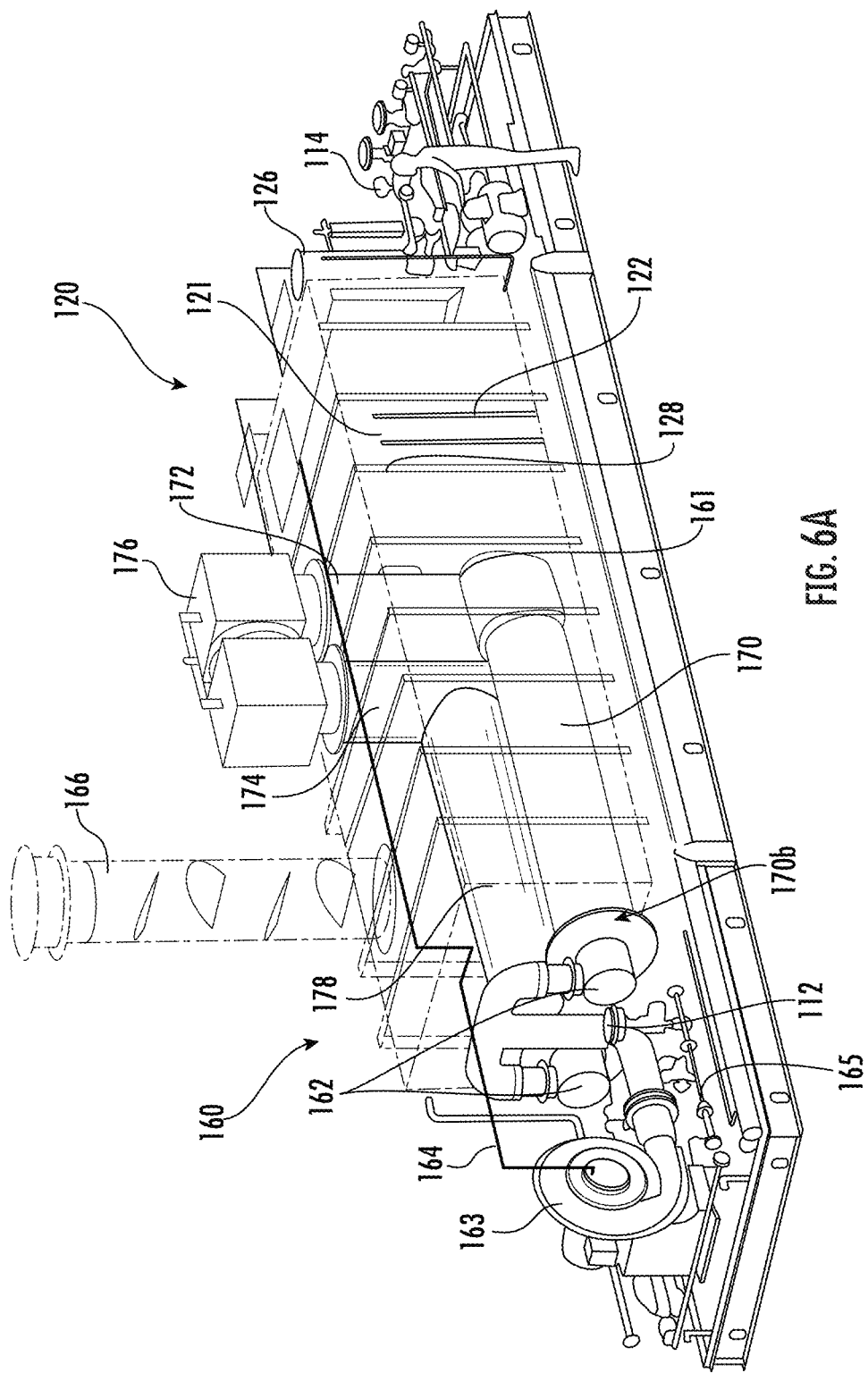
Figure 6B:
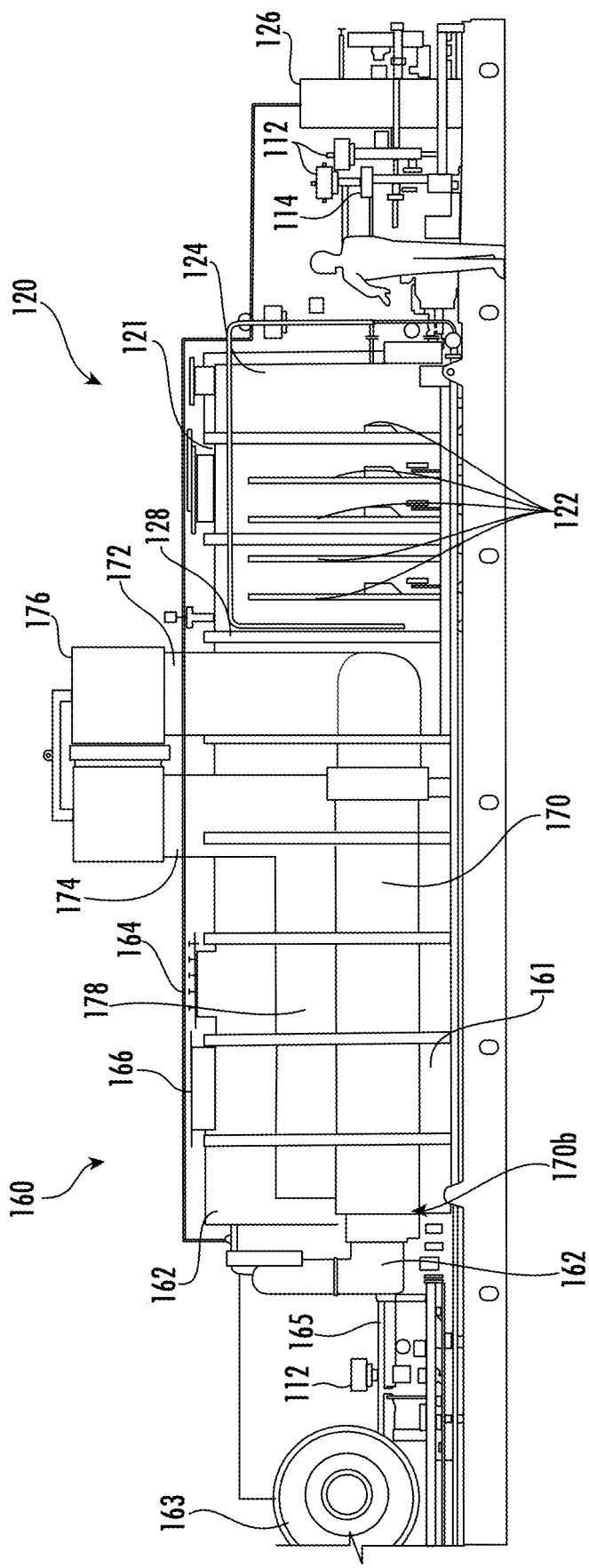

A steam stack 166 extends from the direct fire bath vessel 167 for release of steam generated within the bath vessel. As noted above with respect to FIGS. 1-4, the steam may exhaust into the atmosphere or optionally be condensed. FIG. 6A illustrates the steam stack 166 attached to the steam stack flange and FIG. 6B illustrates the steam stack 166 substantially removed wherein a coupling pipe may attach at the steam stack flange to fluidically couple the steam stack 166 to an inlet 181 of the condenser unit 180 for condensing in a condenser 182. FIG. 5 illustrates the steam stack 166 attached prior to its removal from the flange (see FIG. 6B) and replacement with a coupling pipe to supply steam to the condenser unit 180 in the manner indicated in the flow depiction in FIG. 7.

The condenser 180 is configured to convert the clean steam to liquid state for industry, agricultural, or other use. While any suitable condenser 182 may be used, in a preferred embodiment, the condenser 182 comprises an ambient passive condenser. The ambient passive condenser includes piping for transport of the steam and condensed water. The piping may be any suitable diameter. For example, the piping may be about 1 inch to about 10 inch, about 1 inch to about 5 inch, or about 3 inch in diameter. The piping may include thermally conductive structures having high surface areas for heat dissipation along the piping. For example, the piping may be coupled to fins (not shown). The condenser 182 may operate at any suitable pressure. In the illustrated embodiment, the condenser operates at a vacuum pressure. For example, the condenser may operate at about 6 psi, about 3 psi, about 1 psi or less. In another embodiment, the condenser 182 operates at ambient pressure or an above ambient pressure.

In some embodiments, the condenser 182 of the condenser unit 180 may include one or more condensers that may be actively cooled with refrigerant or cooled fluid. In one example, the condenser 182 includes an ambient passively cooled condenser and an actively cooled condenser. In some embodiments, ambient cooled condensers may be selectively operable to cool actively. In one example, fans may be used to direct air along piping and/or fins.

Figure 7:
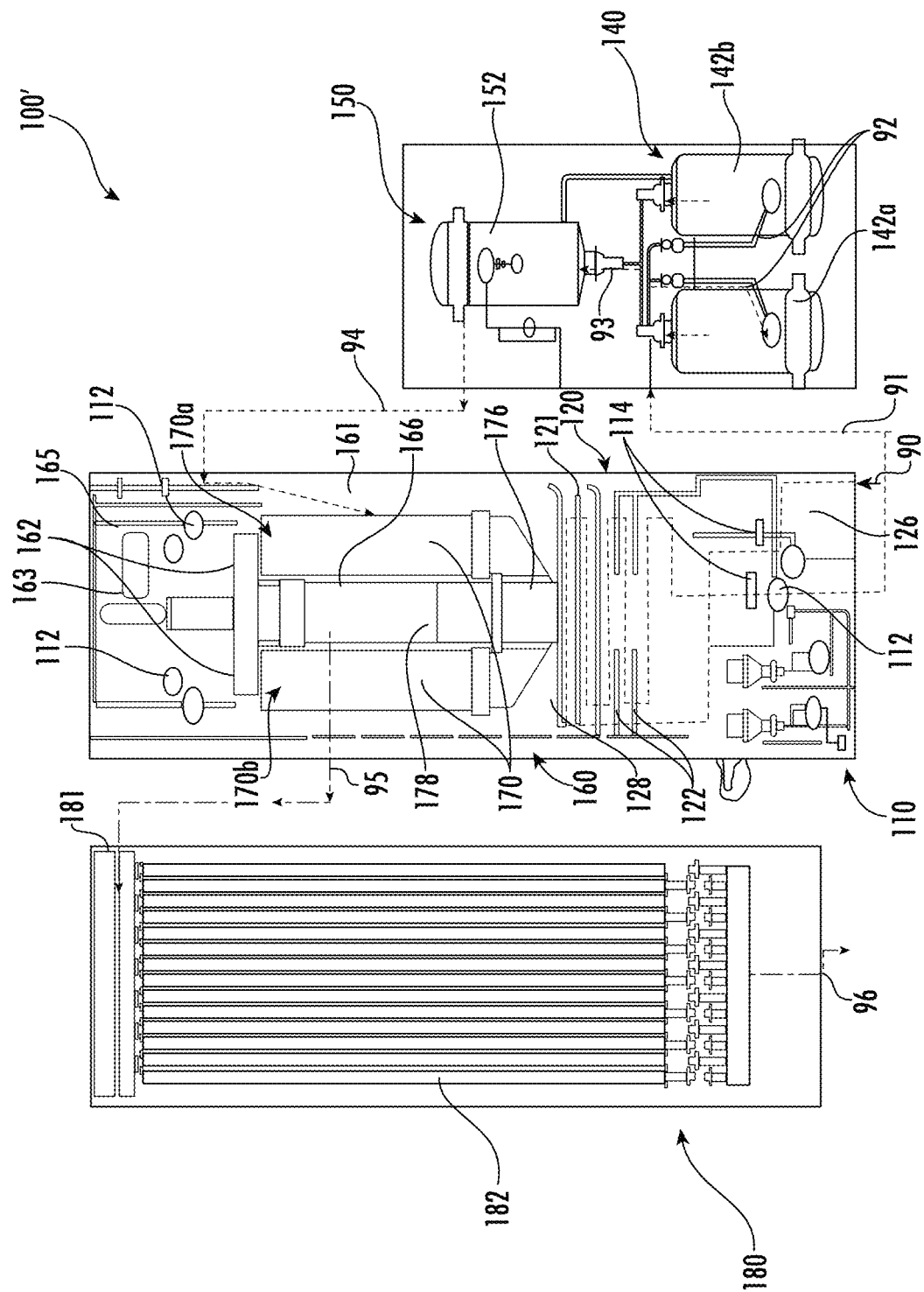
FIG. 7 is a plan view of the produced water treatment system of FIG. 5 illustrating process flow through the system according to various embodiments described herein.

FIG. 7 illustrates a process flow, identified by broken lines, through the produced water treatment system 100'. At position 90, produced water is supplied into the system 100' at a system inlet 90 and is pumped to the float tank 121 by a pump 112. The control unit 110 may perform pumping, metering, and level control functions as described above and elsewhere herein. Suspended solids and oil are assisted to the surface of the produced water by bubbling and are removed by the skimmer 124. The produced water is indirectly heated in the float tank 121 via thermal transfer partition 128 that is heated by the process fluid in the bath vessel 161 that is heated directly and indirectly by the output of the burners 162. The heat flashes VOCs and dissolved organics, which are pulled from the float tank 121 into the VOC gas suction line by the blower 163 and subsequently mixed with air and fuel for combustion and/or incineration at the burners 162.

At position 91, after passage through the skim oil unit 120, the process fluid is flowed from the float tank 121 to the particulate removal unit 140. The process fluid is then passed through particulate/element filters 142 at position 92 to remove particulates to preferably below 30 microns or more preferably 20 microns or less. At position 93, the process fluid is supplied into the liquid/liquid separation unit 150 for removal of remaining hydrocarbons. The process fluid exits the liquid/liquid coalescer 152 and at position 94 is delivered to the flash concentration unit 160 where it is held within the bath vessel 161. The separated skim and hydrocarbons captured from the skim oil unit 120 and liquid/liquid separation unit 150 may be collected for responsible disposal or recycling. In the bath vessel 161, the process fluid is heated indirectly by contact with the fire tube 170, riser tube 172, return tube 174, and distribution tube 178 and directly by a plurality of hot flue gas jets that emanate from a plurality of ports 179 in the distribution tube 178. The heat transitions a portion of the process fluid to clean steam while concentrating the remaining fluid into a concentrated brine. Pumps may operate to control the inflow of process fluid into the bath vessel 161 and the outflow of brine from the bath vessel to maintain a desired salinity. Preferably, the salinity approximates saturation of the concentrated solution. For example, the brine may have a salt composition of about 230,000 ppm to about 250,000 ppm. The brine may be further treated as described with respect to FIG. 1 or may be otherwise used or disposed of in an environmentally responsible manner.

At position 95, the clean steam is flowed to an inlet 181 of the condenser 182 for condensing. The condenser 182 condenses the steam to water and the water is flowed from the condenser unit 180 and exits the system 100' at an outlet at position 96.

Table 1 provides an example analytical report comparing analyte composition of untreated produced water and treated produced water (condensed clean steam) treated according to the method described with respect to FIG. 7. The composition of the treated water is suitable for reinjection, agricultural, or industrial use.

It is to be appreciated that the produced water treatment systems, units, components, and methods thereof described herein may be utilized to treat water, such as waste water, and other liquids other than produced water and that the present application is not limited in this respect.

TABLE 1

| ANALYTE | UNTREATED | TREATED |
| --- | --- | --- |
| Solids, Total Dissolved TDS @ 180° C. (mg/L) | 82,400 | 391 |
| Major Ions (mg/L) | | |
| Alkalinity, Total as $CaCO_3$ | 459 | 246 |
| Bicarbonate as $HCO_3$ | 560 | 300 |
| Chloride | 45,600 | 25 |
| Sulfate | 389 | 42 |
| Calcium | 3620 | 59 |
| Magnesium | 508 | 13 |
| Potassium | 1130 | 5 |
| Sodium | 29,800 | 53 |
| Nutrients (mg/L) | | |
| Nitrate | 0.06 | 4.94 |
| Ammonia | 69 | 9.8 |
| Metals, Dissolved (mEq/L) | | |
| Calcium | 181 | 2.93 |
| Magnesium | 41.8 | 1.05 |
| Sodium | 1,300 | 2.29 |
| Metals, Total (mg/L) | | |
| Mercury | 0.00006 | Not Detected |

Figure 8:
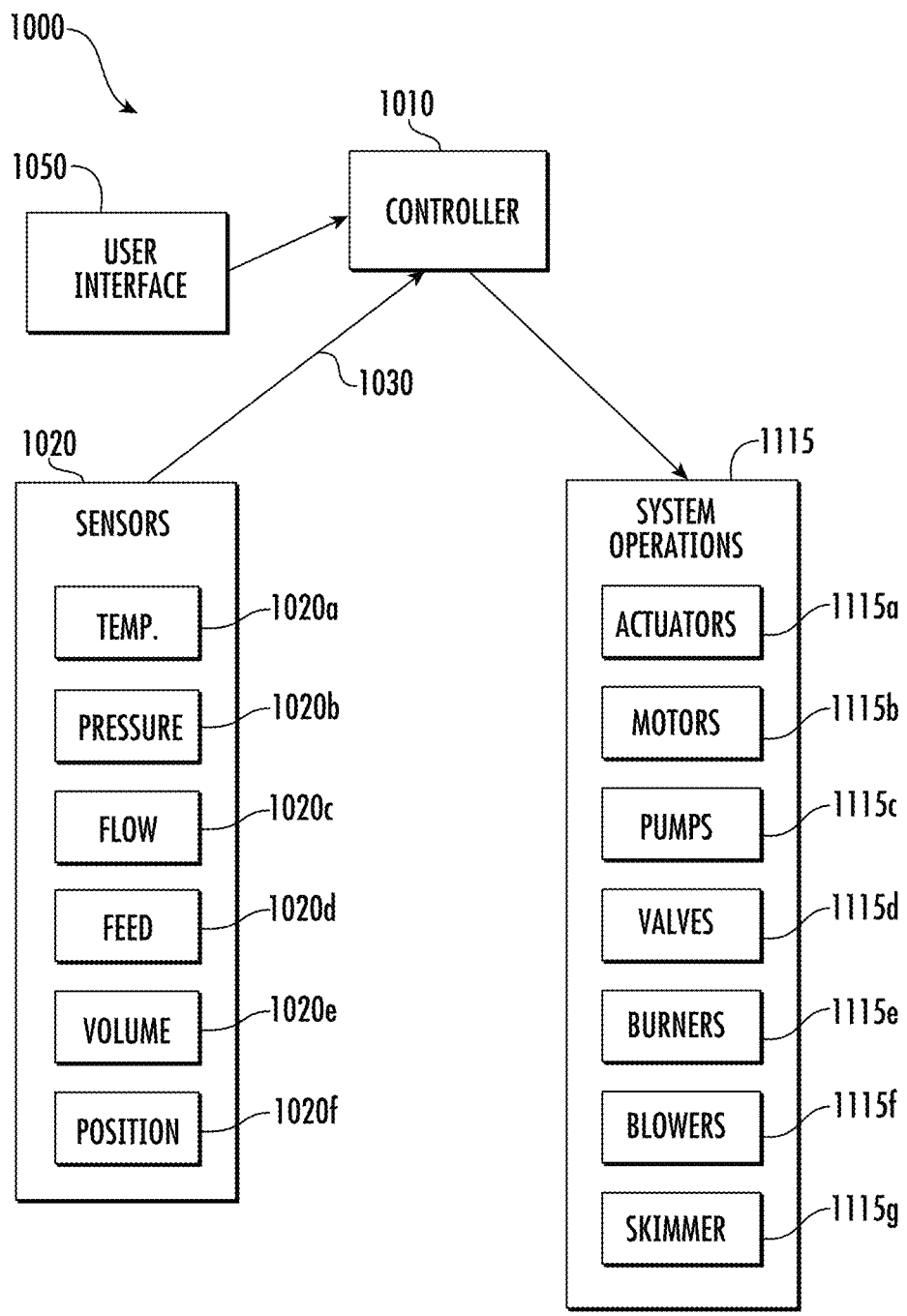
FIG. 8 is a schematic of a control unit control system of the produced water treatment system according to various embodiments described herein.
Figure 9:
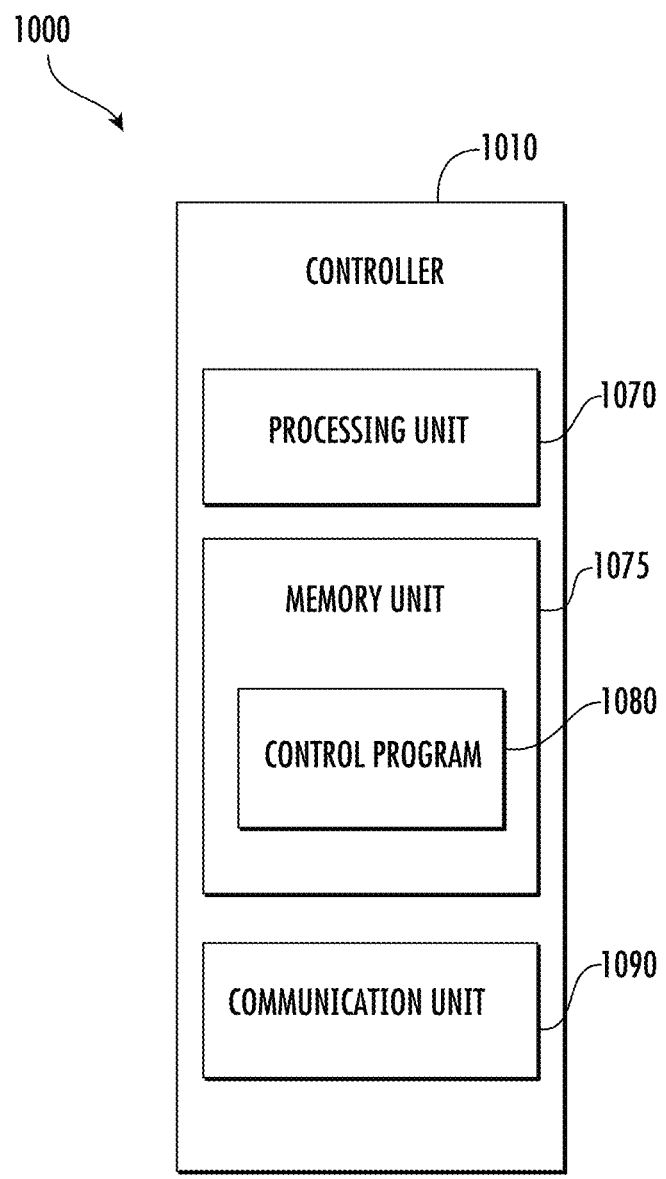
FIG. 9 is a further schematic of the control system including hardware units according to various embodiments described herein.

In any of the above or another example, and with further reference to FIGS. 8 & 9, the produced water treatment system 100, 100' includes a control unit 1000. In some embodiments, the control unit 1000 may include or incorporate a metering system as described above. The control unit 1000 includes a controller 1010 operable to control unit operations 1015, e.g., processes and parameters. For example, the controller 1010 may be operable to actuate valves to control fluid flow, levels, or pressure or initiate, modify, or cease operations of pumps, burners, fuel flow, oxidant or air flow, fans, heaters, coolers, agitators, or other system operations 1015.

In various embodiments, the control unit 1000 may include or communicate with one or more sensors 1020 to obtain produced water treatment data 1030 from which the controller 1010 analyzes to determine various control operations. The produced water treatment data 1030 may be transmitted from the one or more sensors 1020 to the controller 1010 via wired or wireless communication port. For example, the communication port, which may include multiple communication ports each associated with one or more sensors 1020 may include a transmitter or transceiver to transmit the produced water treatment data 1030 to communication port 1040, which may include or communicate with a receiver or transceiver to receive the transmitted produced water treatment data 1030. In some embodiments, the one or more sensors 1020 include thermal sensors, pressure sensors, optical sensors, video or image sensors, proximity sensors, flow sensors, proximity sensors, motion sensors, moisture sensors, weight sensors, sound or electromagnetic wave sensors (transmitter, receiver, or transceivers), capacitance sensors, or other sensors.

FIG. 8 provides an overview of the control unit 1000 for controlling system operations 1015 as described herein. The control unit 1000 comprises a flexible platform from which various tasks or functions related to the operations of the produced water treatment system, e.g., controlling or monitoring the operations of the system.

The control unit 1000 may include a controller 1010 configured to perform various monitoring and control tasks with respect to the produced water treatment system. As introduced above, the controller 1010 may be configured to operatively associate with one or more sensors 1020 positioned to sense, detect, or measure conditions of the produced water treatment system in real-time. The controller 1010 may be configured to route or make available operation data to one or more operation databases 1060 or user interfaces 1050. The operation database 1060, for example, may be accessed by the controller 1010 to retrieve, store, or archive control unit data, which may include raw, processed, or analyzed operation data, events, as well as parameter definitions, including rules, statistics, tables, algorithms, or other data used to process or analyze data including generating or identifying operational conditions. Sensors 1020 may collect operation data comprising produced water treatment data and transmit, either wireless or by wired connection, the produced water treatment data to the controller 1010, as introduced above. The operations database 1050 may include files comprising instructions executable by the controller 1010 to perform one or more aspects of a control program. The controller 1010 a processing unit 1070 as shown in FIG. 9 for executing the instructions. The controller 1010 may execute the control program and be configured to interface the functionalities of the controller 1010 with users via one or more user interfaces 1050. The control program 120 may define various administrative parameters, e.g., definitions or settings, of the control unit 1000 such as operational and administrative decision rules including set points, operational condition identification, and analysis parameters, any of which may include customizable definitions to fit a desired application. For example, the controller 1010 may be operatively associated with one or more processes of the system to monitor, collect, analyze, process, and/or communicate data indicative of operational conditions, events, or states as defined by the control program. In various embodiments, the control program includes selectable processing protocols including set points definitions, threshold definitions, trigger event definitions, and/or response definitions.

The controller 1010 may also be configured to process the operation data. For example, the controller 1010 may analyze the operation data to determine operational conditions, format the operation data into a desired format or generate reports, e.g., enter select data or analyzed data into predefined forms or according to requests received from users interfaces 1050.

In various embodiments, the controller 1010 may be programmed to activate, deactivate, or modulate one or more system actuators 1115a, motors 1115b, pumps 1115c, valves 1115d, burners 1115e, blowers 1115f, skimmer 1115g, or combination thereof. The controller 1010 MAY perform the above operations according to programed sequences according to a formula for example, upon receiving an instruction from a user interface 1050, or in response to produced water treatment data 1030 received from one or more sensors 1020. Sensors 1020 may include temperature sensors 1020a, pressure sensors 1020b, flow sensors 1020c, salinity sensors 1020d, volume sensors 1020e, position sensors 1020f, as well as any other sensor, including those described elsewhere herein. As introduced above, sensors 1020 may transmit produced water treatment data 1030 via wired or wireless connection to the controller 1010. On or more sensors 1020, for example, may include a communication port 1020 configured to send electronic communication signals. For example, sensors 1020 may include a transmitter or transceiver for two-way communication with a communication port 1040 comprising a transceiver in data communication with controller 1030. For example, the controller 1010 may initiate collection of produced water treatment data 1030 from a sensor. The controller 1010 may then activate, deactivate, or modulate a system operation 1115 based on the produced water treatment data 1030 collected by the sensor 1020 and transmitted to the controller 1010. The controller 1010 may analyze the produced water treatment data 1030 communicated from one or more of the sensors 1020 operatively associated with various sub-process equipment and compare the data to thresholds and parameters provided by a predefined program selected by user and then actively modulate system operations 1115 to conform the selected program.

As introduced above, the controller 1010 may be configured to communicate signals to one or more interfaces, e.g., programs, control system or external devices, user access devices or applications, or indicators which reflect a condition, event, state, activity, or function of the produced water treatment system. For example, one such indicator may include a notification, which may include activation of a warning light, an audible alert, or a message sent to and displayed on a graphical display associated with a local or remote user interface such as a system control panel, computer, or personal electronic device, such as a smart phone.

Analysis of operation data may include the controller 1010 utilizing administrative parameters comprising analysis tools to determine, calculate, or classify an operational condition, event, or state and then performing or initiating a predefined response or action in accordance with administrative decision rules specified in the control program. For example, the controller 1010 may compare raw or processed operation data or an operational condition determined using such data to predefined set points. Set points may include measurable standards identified or specified by a user or otherwise defined in the control program. Set points may include, for example, pressures or temperatures, salinities, agitation rates, flow rates, volumes, levels, filter unit flow, fuel rate, blower rate, fuel/air ratio, valve states, filter efficiencies, expected remaining life of filters, etc.

When a set point comparison identifies an occurrence of a trigger event, the controller 1010 may respond in a predefined way. For example, the controller 1010 may transmit to one or more interfaces 1050 a notification, alert, or alarm. Additionally or alternatively the controller 1010 may perform or initiate a control operation specified by a decision rule, e.g., modulate an operation of the produced water treatment system to address a trigger event. In various embodiments, set points or the predefined response to a trigger event may be statically or dynamically defined and, thus, may be beneficially configurable to adapt to different operational conditions or circumstances within any given application. In one embodiment, an authorized user may define the statically or dynamically defined response to one or more trigger events.

FIG. 9 illustrates various hardware units of a controller 1010 according to various embodiments. In general, the controller 1010 may include one or more processors, servers, databases, networks or network devices, and peripherals configured to obtain and transmit data and initiate control operations configured to perform in whole or in part the operations of the control program. As shown, the controller 1010 comprises a processing unit 1070, e.g., one or more electronic data processors or central processing units having logic control functionalities. The controller 1010 further comprises a memory unit 1075 comprising one or more electronic data storage mediums such as recording media, read-only, volatile, non-volatile, semi-conductor based, or other data storage mediums known in the art. The memory unit 1075, for example, includes one or more data storage mediums having stored thereon one or more programs or applications comprising software, firmware, or other instructions stored in one or more files executable by the processing unit 1070 to perform the various operations and functions of the controller 1010. The memory unit 1075 may further include database 1060. The instructions may include the control program 1080, which may include interaction with additional applications or services.

The controller 1010 may also include a communication unit 1090 configured to transmit and receive data. The communication unit 1090 may include one or more data ports, communication ports 1040, transmitters, receivers, transceivers, network cards, modems, gateways, routers, switches, firewalls, local, virtual, wide area, cloud/internet area, or internet-based distributed networks, Ethernet, wireless or wired digital communication devices, telecommunication devices, monitors, speakers, lights, buttons, knobs, or peripherals. The controller 1010 may also include or be operationally associated, e.g., via communication with associated communication ports coupled with sensors or system operations, with control and monitoring components such as sensors, actuators, valves, pumps, power switches, etc. for controlling or monitoring operational conditions of the produced water treatment system.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

Any numerical range recited herein includes all values and ranges from the lower value to the upper value. For example, if a concentration range is stated as 1% to 50%, it is intended that values such as 2% to 40%, 10% to 30%, 1% to 3%, or 2%, 25%, 39% and the like, are expressly enumerated in this specification. These are only examples of what is specifically intended, and all possible combinations of numerical values and ranges between and including the lowest value and the highest value enumerated are to be considered to be expressly stated in this application. Numbers modified by the term "approximately" are intended to include+/−10% of the number modified.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

What is claimed is:

1. A produced water treatment system, the system comprising:
a skim oil unit including a float tank having an interior volume for holding a volume of produced water to be clarified within the float tank;
a flash concentration unit including a bath vessel having an interior volume to receive the clarified produced water and a burner configured to combust a fuel to generate hot flue gas that heats the clarified produced water within interior volume of the bath vessel to generate steam and concentrate the clarified produced water; and
a thermal transfer partition comprising a thermally conductive material separating the respective interior volumes of the float tank and the bath vessel such that clarified produced water heated within the interior volume of the bath vessel by the hot flue gas transfers heat energy directly to the thermal transfer partition and the thermal transfer partition transfers the heat energy directly to produced water within the interior volume of the float tank to flash volatile organic compounds (VOCs) and dissolved organics.

2. The system of claim 1, wherein the float tank comprises a dissolved air floatation tank wherein dissolved air is provided into a lower end of the interior volume of the float tank.

3. The system of claim 1, wherein the flash concentration unit comprises a direct fire bath system including one or more tubes defining a flow path through which the hot flue gas travels between the burner and a distribution end of the flow path where the hot flue gas is emitted into the interior volume of bath vessel.

4. The system of claim 3, wherein at least a portion of the flow path defined by the one or more tubes extends within the interior volume of the bath vessel, below a waterline of the bath vessel that corresponds to an operation level for processing the clarified produced water within the interior volume of the bath vessel during flash concentration processing to indirectly heat the clarified produced water with the hot flue gas when flowed along the flow path.

5. The system of claim 4, wherein the one or more tubes include a distribution tube located at the distribution end, wherein the distribution tube includes a plurality of ports through which hot flue gas exits into the interior volume of the bath vessel, and wherein one or more of the plurality of ports are positioned below the waterline of the bath vessel.

6. The system of claim 5, wherein a first portion of the one or more tubes extends above the waterline such that a corresponding first portion of the flow path extends above the waterline, wherein the first portion of the one or more tubes and corresponding first portion of the flow path is positioned between a second portion of the one or more tubes defining a corresponding second portion of the flow path and a third portion of the one or more tubes defining a corresponding third portion of the flow path, and wherein both the second and third portions of the one or more tubes and the corresponding second and third portions of the flow path position below the waterline within the interior volume of the bath vessel.

7. The system of claim 1, further comprising a gas line positioned to collect gas comprising the flashed VOCs and dissolved organics from the heated produced water in the float tank and supply the gas to the burner for combustion.

8. The system of claim 7, wherein the flash concentration unit further comprises a blower for providing a supply of oxidant to the burner, wherein the gas line comprises a VOC suction line coupled to a negative pressure side of the blower such that the collected gas is pulled into the blower and mixed with oxidant that is supplied to the burner.

9. The system of claim 1, further comprising a control unit, one or more pumps, and a salinity meter positioned to monitor salt concentration in the clarified produced water, wherein the control unit is operable to control the one or more pumps to control supply of clarified produced water into the interior volume of the bath vessel and release of a concentrated clarified produced water generated by the release of the steam from the clarified produced water, and wherein the control unit utilizes salinity data collected by the salinity meter to control the supply of clarified produced water and release of concentrated clarified produced water to maintain a salinity within the clarified process fluid within the interior volume of the bath vessel of between 230,000 ppm and 250,000 ppm.

10. The system of claim 1, further comprising:
a gas line positioned to collect gas comprising the flashed VOCs and dissolved organics from the heated produced water in the float tank and supply the gas to the burner for combustion, wherein the float tank comprises a dissolved air floatation tank wherein dissolved air is provided into a lower end of the interior volume of the float tank.

11. The system of claim 10, wherein the flash concentration unit comprises a direct fire bath system including one or more tubes defining a flow path through which the hot flue gas travels between the burner and a distribution end of the flow path where the hot flue gas is emitted into the interior volume of the bath vessel, wherein the one or more tubes includes a distribution tube comprising a plurality of ports positioned below a waterline of the bath vessel and through which hot flue gas exits into the clarified produced water within the interior volume of the bath vessel, and wherein a first portion of the flow path extends above the waterline and is positioned between second and third portions of the flow path that extend below the waterline.

12. The system of claim 11, further comprising:
a particulate removal unit comprising one or more element filters to receive the clarified produced water and remove particulates down to about 20 microns or less;
a liquid/liquid separation unit comprising a liquid/liquid coalescer to receive the clarified produced water after filtration in the particulate removal unit and separate remaining hydrocarbons from the clarified produced water; and
a control unit, one or more pumps, and a salinity meter positioned to monitor salt concentration in the clarified produced water, wherein the control unit is operable to control the one or more pumps to control supply of clarified produced water into the interior volume of the bath vessel and release of a concentrated clarified produced water generated by the release of the steam from the clarified produced water, and wherein the control unit utilizes salinity data collected by the salinity meter to control the supply of clarified produced water and release of concentrated clarified produced water to maintain a salinity within the clarified process fluid within the interior volume of the bath vessel of between 230,000 ppm and 250,000 ppm.

13. The system of claim 11, further comprising a condenser unit, wherein the condenser unit comprises a condenser to receive the steam generated in the bath vessel and condense the same to produce a clean water stream, wherein the condenser unit comprise a passive ambient condenser.

14. A method of treating produced water, the method comprising:
clarifying the produced water in a dissolved air floatation tank into which dissolved gas is introduced into a lower end of the floatation tank;
heating the produced water in the floatation tank during the clarifying with dissolved gas to flash VOCs and dissolved organics within the produced water;
skimming the surface of the produced water in the floatation tank;
flashing clarified produced water in a flash concentration unit comprising a direct fire bath, wherein one or more tubes extend through the direct fire bath and provide a flow path for hot combustion gas to flow between a burner and a distribution end of the flow path where the hot combustion gas directly heats and flashes a portion of the clarified produced water in the direct fire bath to generate steam and a concentrated brine solution,
wherein a thermal transfer partition comprising a thermally conductive material separates the direct fire bath and the dissolved air floatation tank, wherein the clarified produced water in the direct fire bath transfers heat energy directly to the thermal transfer partition and the thermal transfer partition transfers heat energy directly to the produced water in the dissolved air floatation tank.

15. The method of claim 14, wherein the method further comprises collecting the flashed VOCs and dissolved organic gas and supplying it to the burner for combustion.

* * * * *